US006708180B1

(12) United States Patent
Dyck et al.

(10) Patent No.: US 6,708,180 B1
(45) Date of Patent: Mar. 16, 2004

(54) METHOD AND APPARATUS FOR RUNTIME REMEDIATION OF OBJECT-CODE INSTRUCTIONS IN A COMPUTER PROGRAM

(75) Inventors: Greg A. Dyck, Poughkeepsie, NY (US); Brian B. Moore, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 09/133,878

(22) Filed: Aug. 14, 1998

(51) Int. Cl.[7] .............................................. G06F 17/30
(52) U.S. Cl. .................. 707/103 R; 707/200; 712/208; 712/244
(58) Field of Search ................................ 712/244, 208; 707/100–104, 200–205; 600/545; 700/83; 705/54; 717/5

(56) References Cited

U.S. PATENT DOCUMENTS

| | | | |
|---|---|---|---|
| 5,121,501 A | 6/1992 | Baumgartner et al. | 395/800 |
| 5,454,086 A | 9/1995 | Alpert et al. | 395/375 |
| 5,546,586 A | 8/1996 | Wetmore et al. | 395/700 |
| 5,592,613 A | 1/1997 | Miyazawa et al. | 395/182 |
| 5,600,836 A | 2/1997 | Alter | 395/612 |

(List continued on next page.)

OTHER PUBLICATIONS

The Journal of Defense Software Engineering, Oct. 97, p. 18–p.25, "Dealing with Dates: Solutions for the Year 2000" by Robert A. Martin of MITRE Corporation.
http://www.year2000.com/archive/options.html, Procedural and Data Change Options for Century Compliance. "A Comparison of Procedural and Data Change Options for Century Compliance" by Andrew Eldridge, et al.

Daily Freeman Newspaper article, Jun. 06, 1998, p. 11, "Would–be inventor patents 'simple' solution to Year 2000 computer glitch".

(List continued on next page.)

Primary Examiner—James P. Trammell
Assistant Examiner—Mary Wang
(74) Attorney, Agent, or Firm—William A. Kinnaman, Jr.

(57) ABSTRACT

A method and apparatus for runtime remediation of object-code instructions (such as date instructions that are not year 2000 compliant) in a computer program. Before runtime, a setup function of a program monitor locates each instruction to be remediated in a load module of a user program and overlays the instruction with a trap instruction. The address of the overlaid instruction is stored in a scan slot of a window control table (WCT). The text of the overlaid instruction is stored in a corresponding operand slot of the WCT along with control information including a set of flags and windowing and cycling parameters. At runtime, upon decoding a trap instruction, the CPU transfers control to an instruction simulation function of the program monitor, which searches the scan slots of the WCT for the one containing the address of the overlaid instruction. Upon finding the scan slot, the instruction simulation function performs an instruction simulation operation in accordance with the control information in the corresponding operand slot, then returns control to the user program. If an execute flag is not set, the instruction simulation function invokes a specified user routine without executing the overlaid instruction. If the execute flag is set, the instruction simulation function executes the overlaid instruction in a mode of operation determined by the remaining flags. In a windowing mode, one or both instruction operands are compared with a specified delimiter, and the instruction is executed as though a specified increment were added to the operand before performing the operation of the instruction if the operand is less than the delimiter. In a cycling mode, a specified increment is added to the result the instruction would otherwise produce if that result is less than zero.

29 Claims, 15 Drawing Sheets

U.S. PATENT DOCUMENTS

| | | | | |
|---|---|---|---|---|
| 5,630,118 A | | 5/1997 | Shaughnessy | 395/601 |
| 5,644,762 A | | 7/1997 | Soeder | 395/606 |
| 5,668,989 A | | 9/1997 | Mao | 395/612 |
| 5,761,668 A | | 6/1998 | Adamchick | 707/101 |
| 5,809,500 A | * | 9/1998 | Nolan | 707/6 |
| 5,813,012 A | * | 9/1998 | Chase et al. | 707/102 |
| 5,878,422 A | * | 3/1999 | Roth et al. | 707/100 |
| 5,897,633 A | * | 4/1999 | Nolan | 707/6 |
| 5,930,782 A | * | 7/1999 | Shaughnessy | 707/1 |
| 5,950,197 A | * | 9/1999 | Beam | 707/6 |
| 6,003,028 A | * | 12/1999 | Koenig | 707/6 |
| 6,041,330 A | * | 3/2000 | Carman et al. | 707/101 |
| 6,044,371 A | * | 3/2000 | Person et al. | 707/6 |
| 6,065,004 A | * | 5/2000 | Soeder | 707/6 |
| 6,071,317 A | * | 6/2000 | Nagel | 717/4 |

OTHER PUBLICATIONS http://www.hds.com/voyager/announce.html; OaYDaNP4AkF_2X50qCCI7x#9cmfkwA0WOTfhjdp4C, Hitachi Data Systems, "HDS Voyager Family Leads S/390 Users into the Next Millennium —on Track and on Time". Santa Clara, California, May 1997, 9 pages.

http://www.sas.com/software/year2000/yr2000.html, Software Technologies Year 2000 Compliance, "The Year 2000: Preparing for the Inevitable", by Langston, et al, 7 pages.

wysiwyg://122/http://y2k.state.fl.us/y2ksite/yr2ktools.html, State of Florida Year 2000 Task Force, Year 2000 Tools & Training, 12 pages.

http://www.bmrsoftware.com/news.html, BMR Software, Inc.: The Solution for the year 2000, News publication, 17 pages, reprinted from The Wall Street Journal, Jun. 20, 1997.

IBM Manual, GC28–1251–07, Sep. 1997, The Year 2000 and 2–Digit Dates: A Guide for Planning and Implementation.

IBM Manual, SA22–7201–02, "Enterprise Systems Architecture/390 Principles of Operation".

* cited by examiner

METHOD AND APPARATUS FOR RUNTIME REMEDIATION OF OBJECT-CODE INSTRUCTIONS IN A COMPUTER PROGRAM

CROSS-REFERENCED TO RELATED APPLICATION

This application is related to the commonly owned, concurrently filed application of G. A. Burke et al., Ser. No. 09/134,010 entitled "Method and Apparatus for Performing a Trap Operation in an Information Handling System", incorporated herein by reference.

BACKGROUND OF THE INVENTION

1. Field of the Invention

This invention relates to a method and apparatus for runtime remediation of object-code instructions in a computer program and, more particularly, to a method and apparatus for runtime remediation of date instructions in a computer program that is not year 2000 compliant.

2. Description of the Related Art

The so-called year 2000 problem, or millennium bug as it is sometimes referred to, has received considerable attention lately. The problem arises from the fact that date representations in programs, files, and databases often use a two-digit year (YY) value, representing the year 1998, for example, simply as "98", with the century being understood. Programs that perform arithmetic or comparison operations on such dates may give incorrect or unexpected results when dealing with years after 1999, since the understanding as to the century may no longer be correct. Thus, a date reference of "00" for the year 2000 may be erroneously interpreted as referring to the year 1900. A program making such an erroneous interpretation may determine that a credit card expiring in the year "00" expired in the year 1900 or that a payment due in the year "00" was due in 1900, with unfortunate results.

Various remediation techniques have been proposed in the prior art, such as those described in U.S. Pat. No. 5,600,836 to Alter, U.S. Pat. No. 5,630,118 to Shaughnessy, U.S. Pat. No. 5,644,762 to Soeder, U.S. Pat. No. 5,668,989 to Mao, and U.S. Pat. No. 5,761,668 to Adamchick, all incorporated herein by reference. Perhaps the most straightforward technique is to modify the original source code (e.g., COBOL code) to change all two-digit year references to four-digit year references that cannot be misinterpreted. However, this is often impractical for several reasons, including the large repository of data files in the old format that often exist.

Various other, less radical techniques may be applied to either source code or object code. On such technique, described in U.S. Pat. No. 5,600,836, is called "windowing". In windowing, two-digit year references are still understood is referring to a 100-year range, but one that is offset to include the years of interest, for example, the range 1928–2027. In this example, two-digit year references in the range 0–27 are interpreted as referring to the period 2000–2027, while two-digit year references in the range 28–99 are interpreted as referring to the period 1928–1999. While this technique must be used with caution to ensure that the year dates being processed do not fall outside the given 100-year range, it permits the use of existing data files.

Another technique, operating on object code, is that used by RTX Time Warp, part of the HDS RTX (Run Time eXtensions) Environment available from Hitachi Data Systems. Preliminarily, an object-code program is scanned for Subtract and Compare instructions having date operands that are susceptible to year 2000 failure. Each such date instruction is replaced by a "00" op code, and an entry for the instruction, identifying the program, the instruction location, the instruction type and the date format, is made in a registration table. When encountered at execution time, the "00" op code causes a suspension of execution, resulting in a transfer of control to RTX Time Warp. RTX Time Warp then looks for the instruction in the registration table and executes it while taking an appropriate corrective action. Thus, if the registered instruction is a Subtract instruction and produces a negative result (for example, if an operand of 4 representing an interval of 4 years is subtracted from a date operand 02 representing the year 2002), RTX Time Warp adds 100 to the result. Similarly, if the registered instruction is a Compare instruction (for example, comparing the operands 98 and 02 representing the year dates 1998 and 2002), RTX Time Warp determines whether the condition code resulting from the comparison operation should be reversed to produce a correct result.

While the HDS tool has the advantage of being usable in situations where source code is unavailable, it is relatively limited in its repertoire of instructions that can be remediated (Subtract and Compare instructions) as well as the remediation techniques that are available.

SUMMARY OF THE INVENTION

In general, the present invention contemplates a method and apparatus for runtime remediation of object-code instructions (such as date instructions that are not year 2000 compliant) in a computer program. Before runtime, a setup function of a program monitor locates each instruction to be remediated in a load module of a user program and overlays the instruction with a trap instruction. The address of the overlaid instruction is stored in a scan slot of a window control table (WCT). The text of the overlaid instruction is stored in a corresponding operand slot of the WCT along with control information including a set of flags and windowing and cycling parameters.

At runtime, upon decoding a trap instruction, the CPU transfers control to an instruction simulation function of the program monitor, preferably using the trap instruction described in the related application referred to above. Upon gaining control, the instruction simulation function searches the scan slots of the WCT for the one containing the address of the overlaid instruction. Upon finding the scan slot, the instruction simulation function performs an instruction simulation operation in accordance with the control information in the corresponding operand slot, then returns control to the user program. If an execute flag is not set, the instruction simulation function invokes a specified user routine without executing the overlaid instruction. If the execute flag is set, the instruction simulation function executes the overlaid instruction in a mode of operation determined by the remaining flags. In a windowing mode, one or both instruction operands are compared with a specified delimiter, and the instruction is executed as though a specified increment were added to the operand before performing the operation of the instruction if the operand is less than the delimiter. In a cycling mode, a specified increment is added to the result the instruction would otherwise produce if that result is less than zero.

DESCRIPTION OF THE PREFERRED EMBODIMENTS

Figure 1A:
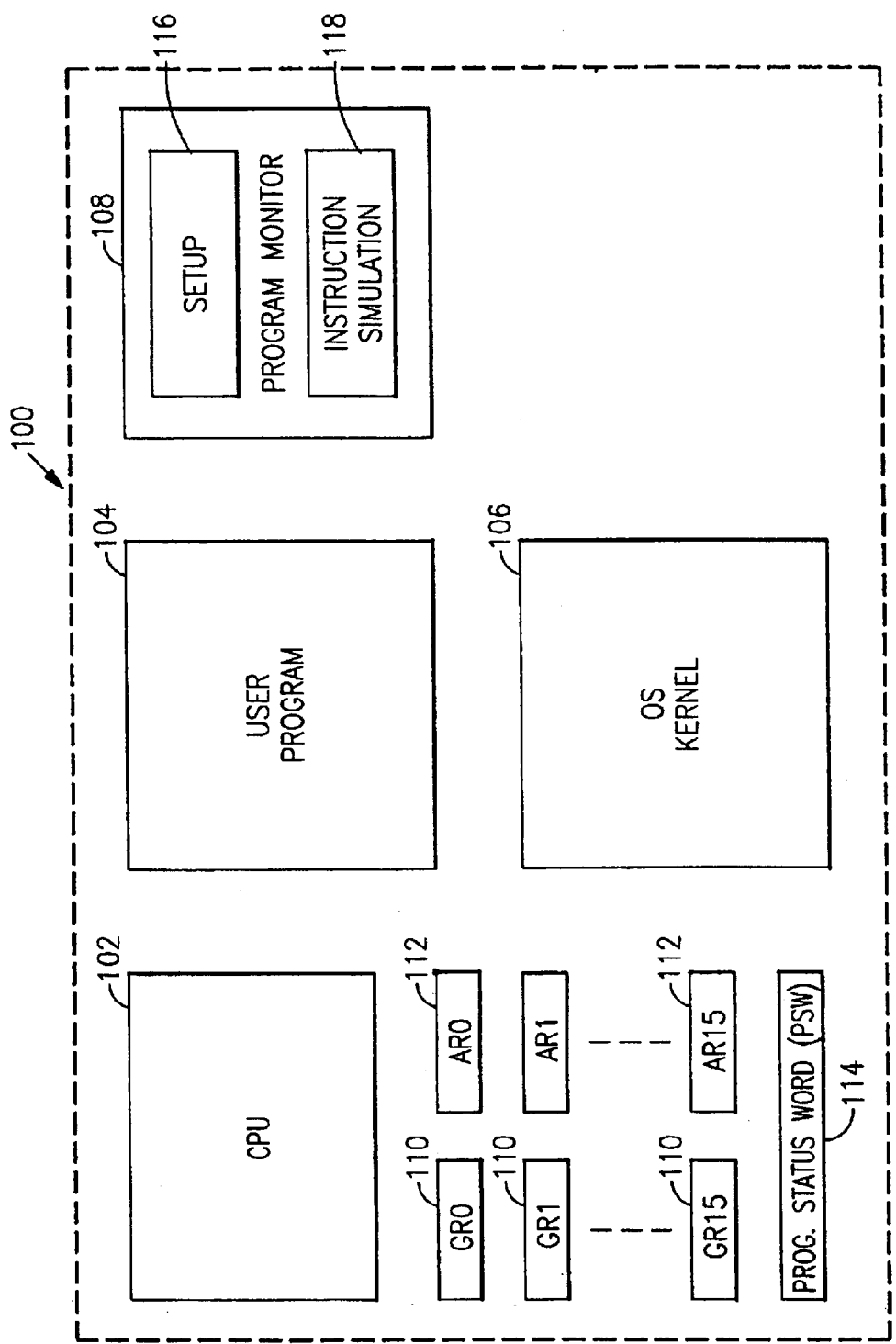
FIG. 1A shows a computer system incorporating the present invention.

Although the present invention is not limited to any particular set of date formats, the ones that figure most prominently in the present description are the Gregorian date format (YYMMDD), the Julian date format (YYDDD), and the two-digit year format (YY). In the Gregorian date format, a calendar date is represented as a six-digit decimal number YYMMDD, where the first two digits YY represent the year of the century, the next two digits MM represent the month of the year, and the last two digits DD represent the day of the month. In the Julian date format, a calendar date is represented as a five-digit decimal number YYDDD, where the first two digits YY represent the year of the century and the last three digits DDD represent the day of the year. Finally, only the year itself may be represented as a two-digit decimal number YY representing the year of the century. As a particular example, the date Feb. 28, 1999 may be represented by the decimal number 990228 in the Gregorian format, by the decimal number 99059 in the Julian format, and the year information only by the decimal number 99 in the two-digit year format. All of these formats lack century information, hence their ambiguity in many situations.

Each of these date formats may be stored using a variety of data formats. Although the present invention is not limited to any particular set of data formats, the ones discussed below are the packed decimal format, the zoned decimal format, and the binary format. In the packed decimal format, each decimal digit of the date format is represented by a four-bit binary-coded decimal (BCD), with two digits being stored in each byte of data. In the zoned decimal format, each decimal digit of the date format is again represented by a four-bit binary-coded decimal (BCD), but with each digit being stored in a four-bit zone of a separate byte. In the binary format, the decimal date representation is converted to a binary representation, which is stored in the usual manner. In converting from decimal to binary, the decimal number is treated as a single quantity without being segmented into different units of time. Thus, the above Gregorian date 990228 would be represented by the binary value 1111 0001 1100 0001 0100 (hex F1C14). As already noted, these data formats are illustrative only; the particular type of instruction remediation used would depend on the particular data format of the instruction.

In the embodiment shown, an instruction simulation function is used to remediate compare, subtract, add and multiply instructions that have date operands and may produce incorrect or unexpected results because the operands are not year 2000 compliant. Although the present invention is not limited to any particular instruction set architecture, the IBM S/390® instruction set used as an example herein has the following arithmetic and compare instructions that are susceptible to the described remediation procedures:

Add (A, AR): Adds a second operand to a first operand and stores the result in the first operand location. Operands and result are 32-bit signed binary integers. In the AR variant, the second operand is contained in a register.

Add Halfword (AH): Similar to Add except that second operand is a 16-bit signed binary integer.

Add Halfword Immediate (AHI): Similar to Add Halfword except that second operand is an immediate operand.

Add Decimal (AP): Similar to Add except that operands and result are in packed decimal format.

Compare (C, CR): Compares a first operand with a second operand and indicates the result in the condition code (CC). Operands are 32-bit signed binary integers. In the CR variant, the second operand is contained in a register.

Compare Halfword (CH): Similar to Compare except that second operand is a 16-bit signed binary integer.

Compare Logical (character) (CLC): Similar to Compare except that comparison is logical, proceeding bytewise from left to right until an inequality is found. May be used with packed decimal, zoned decimal, or binary data formats.

Compare Decimal (CP): Similar to Compare except that operands are in packed decimal format.

Multiply (M): Multiplies the second word of a doubleword first operand by a single-word second operand and places the doubleword result in the first operand location. Operands and result are signed binary integers.

Multiply Halfword (MH): Similar to Multiply except that first operand is a single word and second operand is a halfword.

Multiply Halfword Immediate (MHI): Similar to Multiply Halfword except that second operand is an immediate operand.

Multiply Decimal (MP): Similar to Multiply except that operands and result are in packed decimal format.

Multiply Single (MS, MSR): Similar to Multiply except that first operand and result are single words. In the MSR variant, the second operand is contained in a register.

Subtract (S, SR): Subtracts a second operand from a first operand and stores the result in the first operand location. Operands and result are 32-bit signed binary integers. In the SR variant, the second operand is contained in a register.

Subtract Halfword (SH): Similar to Subtract except that second operand is a 16-bit signed binary integer.

Subtract Decimal (SP): Similar to Subtract except that operands and result are in packed decimal format.

Further particulars of these and other instructions of the S/390 instruction set may be found in the IBM publication

*Enterprise Systems Architecture/390 Principles of Operation*, SA22-7201-02, 1994, and successor versions thereof, incorporated herein by reference.

Although the present invention is not limited to any particular remediation technique, the ones that will be described below are windowing and cycling. As noted above, in windowing two-digit year references are understood as referring to a 100-year range that is offset to include the years of interest, for example, the range 1928–2027. To make arithmetic and comparison operations come out correctly, each operand representing or containing a year date is compared with the windowing delimiter (in this case, 28 for a YY format). If the operand is less than the delimiter, then it is understood as referring to the second of two century periods (e.g., the period 2000–2099), and the appropriate increment (100 for a YY format) is added before performing the operation of the instruction. On the other hand, if the operand is equal to or greater than the delimiter, then it is understood as referring to the first of two century periods (e.g., the period 1900–1999) and is left unchanged.

For other date formats, the digits of the delimiter and increment are appropriately shifted to agree with the positions of the YY values. Thus, for the same window (1928–2027) in the Gregorian (YYMMDD) date format, the delimiter is 280000 and the increment is 1000000, i.e., the digits 28 and 100 of the delimiter and increment are each moved four places to the left. Similarly, for the same window (1928–2027) in the Julian (YYDDD) date format, the delimiter is 28000 and the increment is 100000, i.e., the digits 28 and 100 of the delimiter and increment are each moved three places to the left.

For an instruction having one date operand and one non-date operand (e.g., adding an interval to or subtracting an interval from a date), windowing is performed on the date operand. That is, the date operand is compared with the delimiter and, if it is less than the delimiter, then the increment is added before performing the operation of the instruction. For example, to subtract from a YY year date 02 (=2002) an interval 4, the year date is compared with the delimiter, which in this case is assumed to be 28. Since the year date is less than the delimiter, an increment of 100 is added to it before performing the operation of the instruction, so that the operation in effect becomes (100+2)−4=98, producing the correct result.

For an instruction having two date operands, windowing is performed on both operands. Each operand is compared with the delimiter and, if it is less than the delimiter, then the increment is added before performing the operation of the instruction. For example, to subtract from a first YY year date 02 (=2002) a second YY year date 98 (=1998), each year date is compared with the delimiter, which is again assumed to be 28. Since the second year date is less than the delimiter, an increment of 100 is added to it before performing the operation of the instruction, so that the operation in effect becomes (100 +2)−98=4, producing again the correct result.

Cycling, on the other hand, does not assume that operands fall within any particular 100-year window. Rather, it assumes that the meaningful result is a positive number, and increments the result as necessary to make this occur. Thus, if a one operand (either a year date or an interval) is subtracted from another operand representing a year date, it is assumed that the meaningful result is positive. If the raw result is negative, the other operand is assumed to represent the later of two centuries and the raw result is therefore incremented by 100 to produce a correct final result. For example, if an operand of 98 (representing the year 1998) is subtracted from an operand of 02 (representing the year 2002), then the raw result of −96 is incremented by 100 (since it is negative) to produce the correct result of 4.

Similarly, if a negative operand is added to a positive operand, it is assumed that the meaningful result is positive. If the raw result is negative, the first year date is assumed to represent a later century and the raw result is therefore incremented by 100 to produce a correct final result. For example, if a negative operand of −4 (representing a backward step of 4 years) is added to a positive operand of 02 (representing the year 2002), then the raw result of −2 is incremented by 100 (since it is negative) to produce the correct result of 98 (i.e., the year 1998).

With this background on date formats, data formats and remediation techniques, the particulars of the present invention will now be described.

Figure 1B:
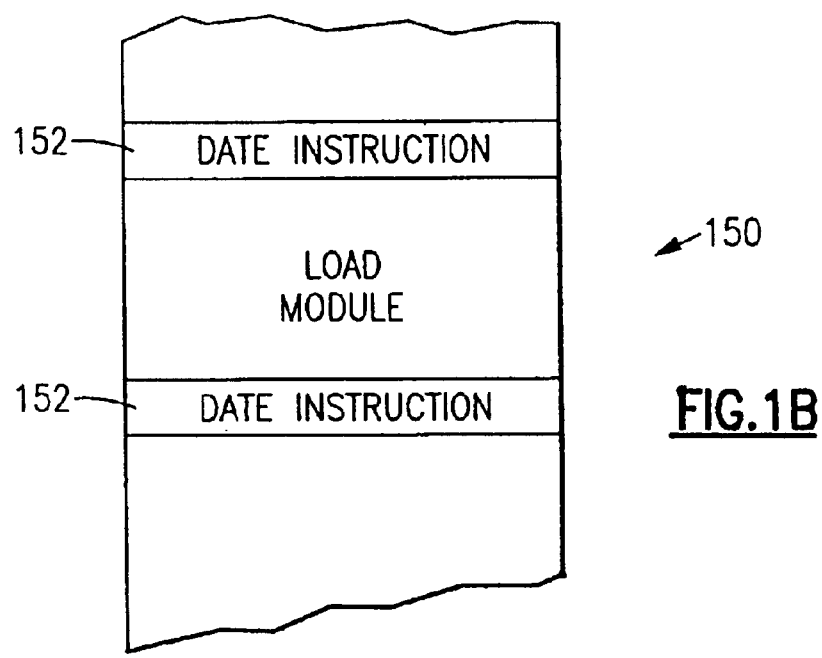
FIG. 1B shows a user program before being overlaid with Trap instructions.

FIG. 1A shows a computer system 100 in which the present invention may be used. As shown in the figure, computer system 100 contains a central processing unit (CPU) 102, at least one user program 104, an operating system (OS) kernel 106, and a program monitor 108. Referring also to FIG. 1B, user program 104 contains one or more load modules 150 containing instructions 152 in object-code form that are remediated as described herein. Typically, instructions 152 are ones for comparing or performing arithmetic operations on year dates that are not year 2000-compliant.

Computer system 100 may comprise either a separate physical machine or a separate partition of a logically partitioned machine. Although the invention is not limited to any particular hardware platform, it will be discussed in the exemplary context of an IBM S/390® environment. In such an environment, system 100 may be an IBM S/390 Parallel Enterprise Server™, while OS kernel 106 may comprise the IBM OS/390® operating system.

CPU 102, which constitutes the primary instruction processing unit of system 100, may comprise one or more central processors (CPs) (not separately shown). As is conventional in the art, CPU 102 has an instruction decoder for decoding instructions being executed as well as an execution unit for executing the decoded instructions. These may be implemented by any suitable combination of hardware and microcode in a manner well known in the art. Since the details of their construction and operation form no part of the present invention, they are not separately shown. CPU 102 has an instruction set that (except for the additional instructions described herein) is generally described in the IBM publication *Enterprise Systems Architecture/390 Principles of Operation*, SA22-7201-02, 1994, and successor versions thereof, incorporated herein by reference. This instruction set, or architecture, defines how the CPU 102 appears to programming such as user program 104 or OS kernel 106.

Associated with CPU 102 are a set of 16 32-bit general registers 110 (GR0–GR15), 16 32-bit access registers 112 (AR0–AR15), and a 64-bit program status word (PSW) 114. General registers 110 are used as base address registers and index registers in address arithmetic and as accumulators in general arithmetic and logical operations. Access registers 112 are used to specify segment table designations used to perform dynamic address translation. PSW 114 stores the address of the next instruction to be executed, along with other pertinent state information, such as a condition code and various settable program modes, as described below. Collectively, general registers 110, access registers 112 and PSW 114 constitute a program context area storing state information defining the execution state of CPU 102.

In addition to registers 110 and 112 and PSW 114, CPU 102 has other registers (such as control registers and floating-point registers) that are generally not relevant to the present invention and are hence not shown in FIG. 1A. They are, however, described in the S/390 architecture document referred to above.

Figure 8:
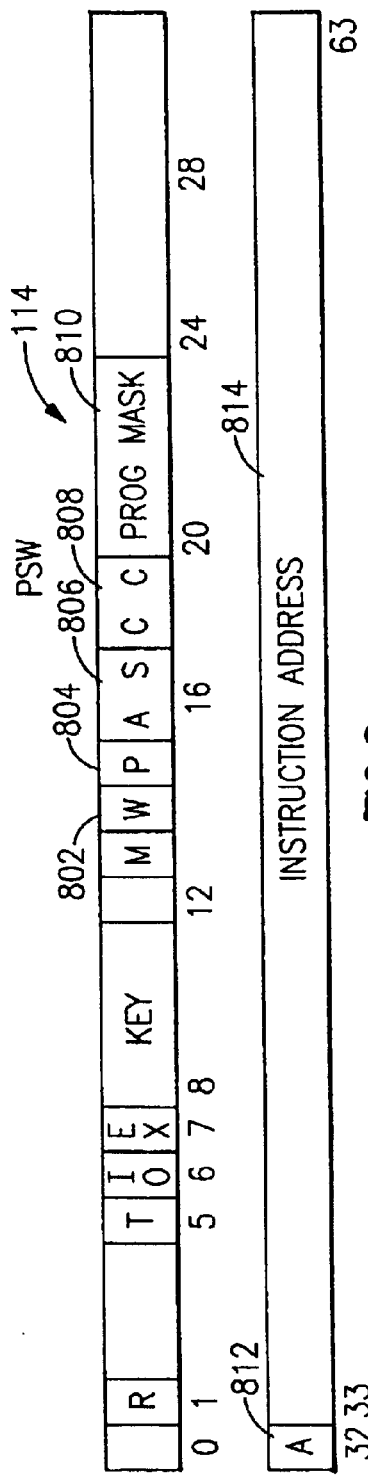
FIG. 8 shows the format of a program status word (PSW).

FIG. 8 shows the format of a conventional S/390 program status word (PSW) 114, as described, for example, in the architecture document referred to above. PSW 114 contains several fields of interest to the present invention, since they are saved in a trap save area as described below. These fields include a wait state (W) 802 (bit 14); a problem state (P) 804 (bit 15); an address space control (AS) 806 (bits 16–17); a condition code (CC) 808 (bits 18–19); a program mask 810 (bits 20–23); an addressing mode (A) 812 (bit 32); and an instruction address 814 (bits 33–63). The wait state (W) bit 802 is set to one to place the CPU 102 in a wait state in which no instructions are processed but interruptions can occur. The problem state (P) bit 804 defines whether the CPU 102 is in the problem state (P=1) or in the supervisor state (P=0). The address space control (AS) 806 specifies, in conjunction with fields in the control registers and control blocks, the instruction address space and the address space containing storage operands. The condition code (CC) 808 is set as a result of certain arithmetic operations and comparisons and can be used to do conditional branching so as to direct program flow based on past results. The program mask 810 specifies, for certain arithmetic results, whether or not those results should cause an interruption, either for terminating program execution or for modifying the results. The addressing mode (A) 812 specifies either a 24-bit or a 31-bit addressing mode. The instruction address 814 is the address of the next instruction to be executed.

Program monitor 108 may be implemented in hardware, in software, or as some combination of the two. In the description that follows, a software implementation will be assumed unless stated otherwise. Program monitor 108 contains a setup function 116 and an instruction simulation function 118.

Figure 1C:
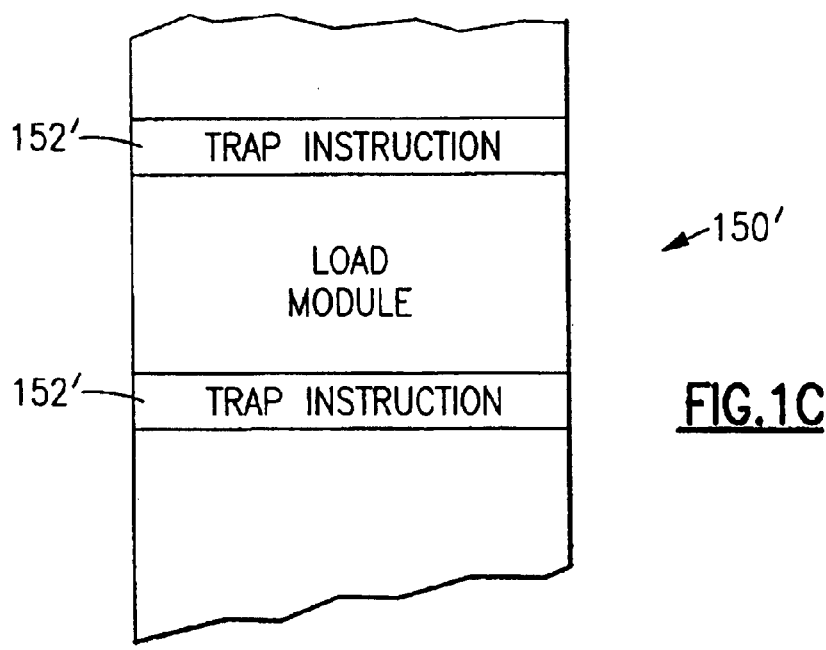
FIG. 1C shows a user program after being overlaid with Trap instructions.

Referring to FIGS. 1B and 1C, the setup function 116 of the program monitor 108 accepts as user input (e.g., from a file) a list of specific arithmetic and compare instructions 152, together with values that modify the behavior of the instructions 152. The input may also identify instructions 152 that invoke one or more user fix-up routines 154. The setup function 116 assigns a class, and one or two slots in the class, to each designated instruction. The classes and slots define areas in a window control table, as described below.

The monitor 108 stores information associated with each designated instruction 152, including the instruction text and values derived from the user inputs, in the assigned slots. The instruction simulation function 118 uses this information to modify the behavior of the instruction 152 when it is executed.

Figure 3A:
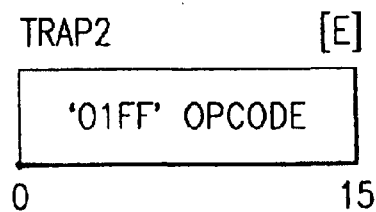
FIG. 3A shows the format of a Trap instruction with no second operand.

Setup function 116 replaces in the load module 150 certain bytes of each designated instruction 152. If the length of the overlaid instruction 152 is 2 bytes, bytes 0–1 (i.e., both bytes of the instruction) are overlaid by a Trap2 instruction 152' (FIG. 3A). On the other hand, if the length of the overlaid instruction 152 is 4 or 6 bytes, bytes 0–3 (i.e., the first four bytes of the instruction) are overlaid by a Trap4 instruction 152'. Setup function 116 generates a modified load module 150' in which each of these instructions 152 is overlaid (i.e., replaced) with a Trap instruction 152' to be described below.

The instruction simulation function 118 of the program monitor 108 is invoked by a Trap instruction 152'. The monitor 108 simulates the instruction 152 that was overlaid by the Trap instruction 152', using information associated with the overlaid instruction 152 from the window control table and applying remediation parameters (e.g., windowing or cycling parameters) to the operands.

Figure 1D:
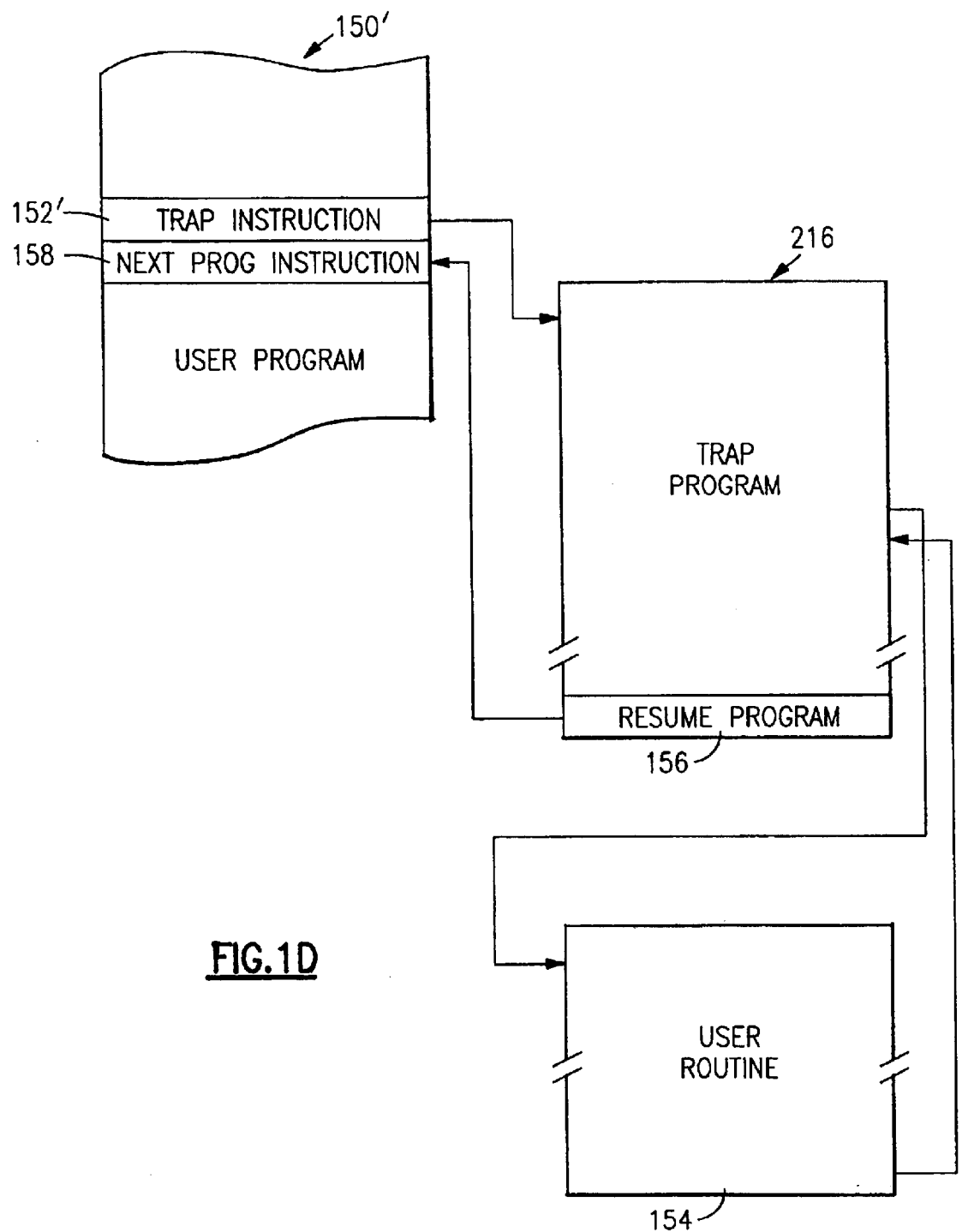
FIG. 1D shows the execution flow between a user program and a trap program.

Referring to FIG. 1D, when a modified load module 150' is later executed, each trap instruction 152' in the module results in a transfer of control to a trap program 216 contained in the instruction simulation function 118 of program monitor 108. Upon gaining control, trap program 216 performs instruction remediation functions such as the functions described below, optionally with the assistance of a user routine 154.

Upon completion of its instruction remediation functions, trap program 216 issues a Resume Program (RP) instruction 156 to return control to the user program 104 at the next sequential instruction 158 following the Trap instruction 152' in the load module 150'. The operation of the Resume Program instruction is fully described in the commonly owned, copending application of D. F. Ault et al., Ser. No. 08/966,374, filed Nov. 7, 1997, entitled "Method and Apparatus for Fully Restoring a Program Context Following an Interrupt", incorporated herein by reference.

The program monitor 108 runs on all systems 100. On machines that are not enabled for hardware execution of the Trap instruction 152', the instruction causes a program interruption. The interruption is handled by a special routine of the operating system 106 that passes control to the program monitor 106 by performing the function defined for the Trap instruction. Similarly, on machines that are not enabled for hardware execution of the Resume Program instruction 156, that instruction also causes an interruption; this time, the operating system routine performs the resume program function to return control to the application 104. The Trap and Resume Program instructions, when enabled, eliminate this overhead of processing interruptions for instructions that require fix-up.

Figure 3B:
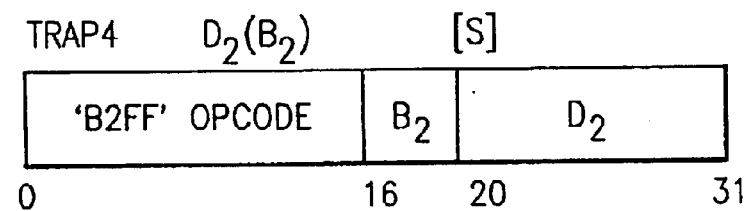
FIG. 3B shows the format of a Trap instruction with a second operand.

The embodiment shown provides a two-byte Trap2 instruction (FIG. 3A) and a four-byte Trap4 instruction (FIG. 3B); the Trap2 and Trap4 instructions are generically referred to herein as Trap instructions when they are not being distinguished from each other. Referring to FIG. 3A, the Trap2 instruction comprises a 16-bit opcode (hex 01FF) as its only element. Referring to FIG. 3B, the Trap4 instruction comprises a 16-bit opcode (hex B2FF), followed by a 4-bit base register specification $B_2$, followed by a 12-bit displacement value $D_2$. In accordance with conventional S/390 address arithmetic, the contents of the general register 110 designated by the $B_2$ field are added to the contents of the $D_2$ field to form the address of a second operand. (The reference to this operand as a "second" operand is a product of the naming conventions of the S/390 architecture, which "implies" a first operand for this instruction format.)

Figure 2:
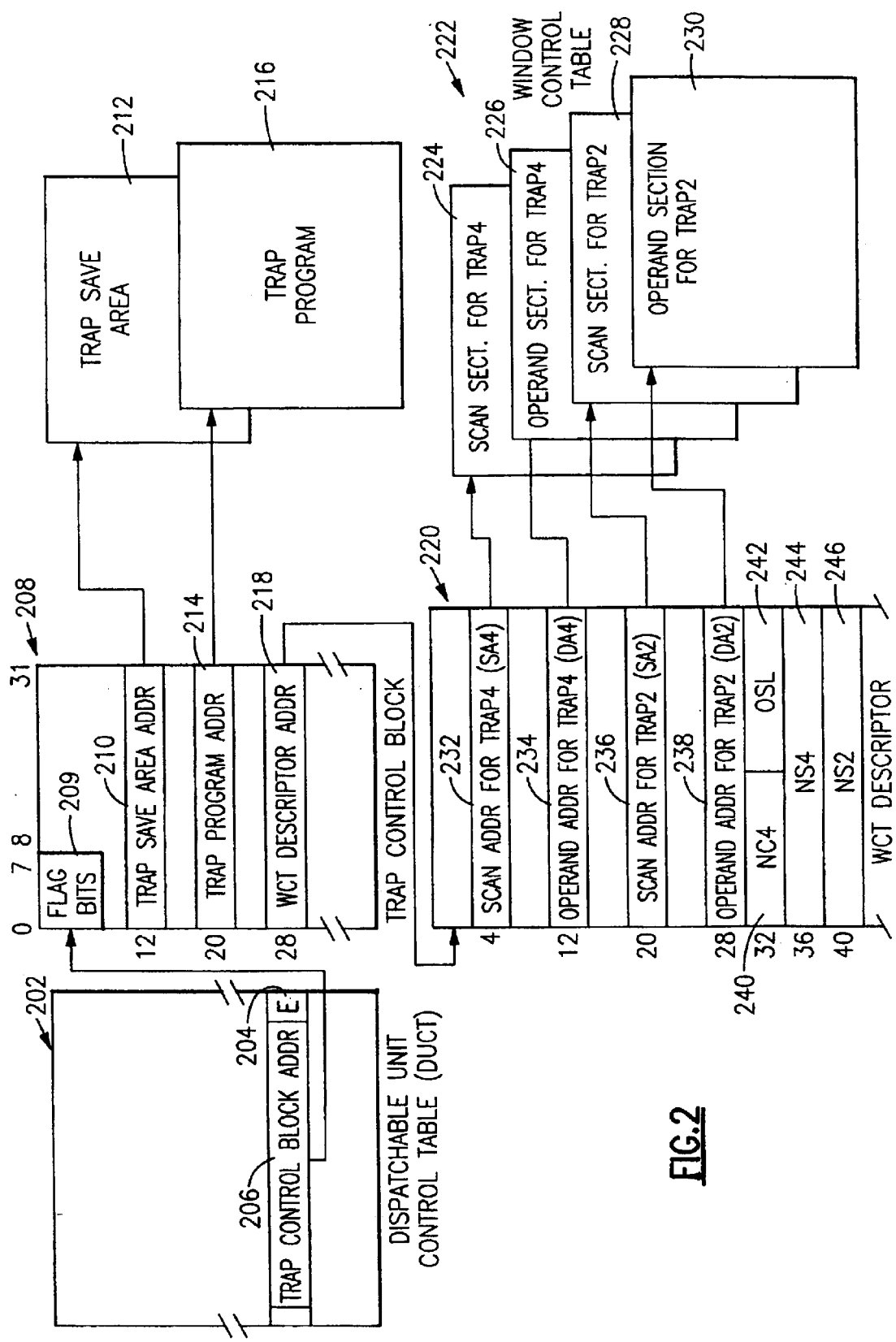
FIG. 2 shows the principal data structures used by the Trap instruction.
Figure 4:
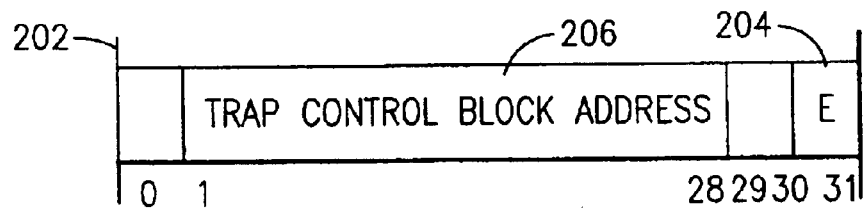
FIG. 4 shows the word in the dispatchable unit control block (DUCT) used by the Trap instruction.

FIG. 2 shows the principal data structures used by the present invention. Trapping controls are associated with a dispatchable unit control table (DUCT) 202 is an existing element of the S/390 architecture, situated at a memory location designated by control register 2 as described in the architecture document referred to above. Referring now also to FIG. 4, in accordance with the present invention, DUCT 202 is modified so that the 32-bit word at byte locations 44–47 of the table includes an enabling (E) bit 204 at bit location 31 (i.e., the low-order bit) and a trap control block (TCB) address pointer 206 at bit locations 1–28. (These and other locations are generally arbitrary, but are given for specificity.) E bit 204 indicates whether CPU 102 is enabled to handle a Trap instruction (such as instructions 152' in FIG. 1C). Trap instructions 152' are enabled for execution when bit 0 of byte 44, the E bit, is one. Address pointer 206 points to a trap control block (TCB) 208. More particularly, the contents of bits 1–28 of the 32-bit word at bytes 44–47, with three zeros appended on the right, form the address in the home address space of a trap control block 208. Bits 5–7 of bytes 47 (bits 29–31 of the 32-bit word) are reserved.

In the embodiment shown, the trap control block (TCB) 208 is 64 bytes long and is aligned on a doubleword boundary.

Bytes 0–1 in the trap control block 208 are reserved for use as flag bits, including a set 209 of flag bits 0–7 at byte location 0. Flag bit 0 of the set 209 specifies hardware execution of the instruction simulation function 118. When flag bit 0 is zero, the trap program 216 is invoked as described herein. Otherwise, the instruction simulation function 118 is performed by the hardware (i.e., by the CPU 102). Flag bits 1–7 are reserved and should be zeros. They may, for example, extend the use of Trap2 to a hook function for debugging application and system programs.

TCB 208 also contains a set of address pointers. Thus, the contents of bits 1–28 of bytes 12–15, with three zeros appended on the right, form the address 210 of a trap save area 212 in the home address space as defined in the S/390 architecture document referred to above; bits 0 and 29–31 are ignored.

Similarly, bits 1–31 of bytes 20–23 contain the address of a trap program 216 in the primary address space as defined in the architecture document referred to above; bit 0 is ignored. Finally, the contents of bits 1–28 of bytes 28–31, with 3 zeros appended on the right, form the address 218 of a window control table (WCT) descriptor 220 in the primary address space; bit 0 is ignored. WCT descriptor 220 contains pointers and format information for a window control table (WCT) 222, to be described below. WCT descriptor 220 and WCT 222 are used by the instruction simulation function 118 as described below.

Bits 29–31 of bytes 28–31, as well as the remaining byte locations in TCB 208, are reserved and should be set to zeros.

Figure 5:
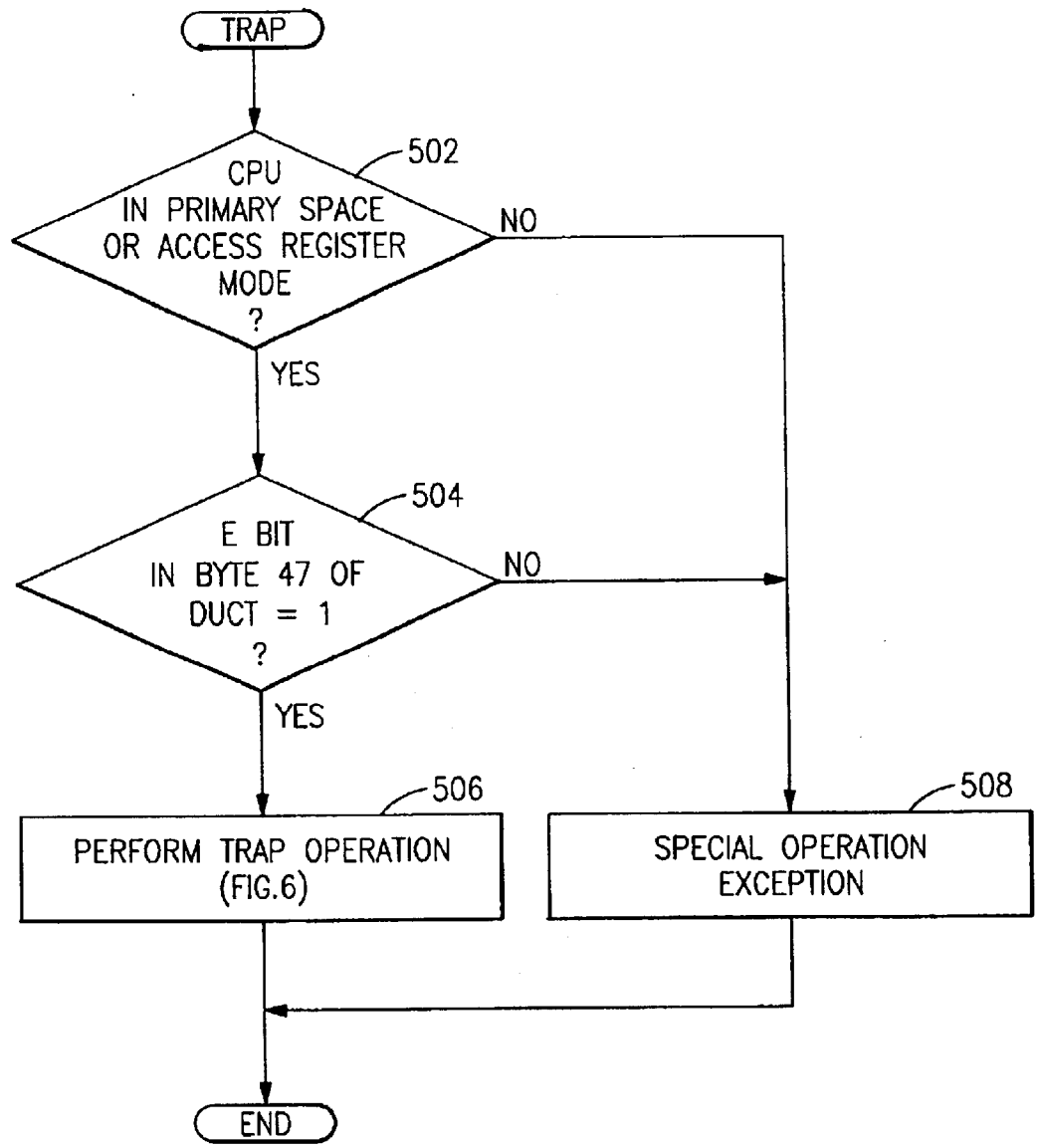
FIG. 5 shows the overall flow of execution of a Trap instruction.

Referring first to FIG. 5, a trap operation (FIG. 6) is performed (step 506) if the CPU 102 is in the primary space or access register mode (step 502) and the E bit 204 in byte 47 of the dispatchable unit control table (DUCT) 202 is one (step 504). Otherwise, a special operation exception is recognized (step 508).

Figure 6:
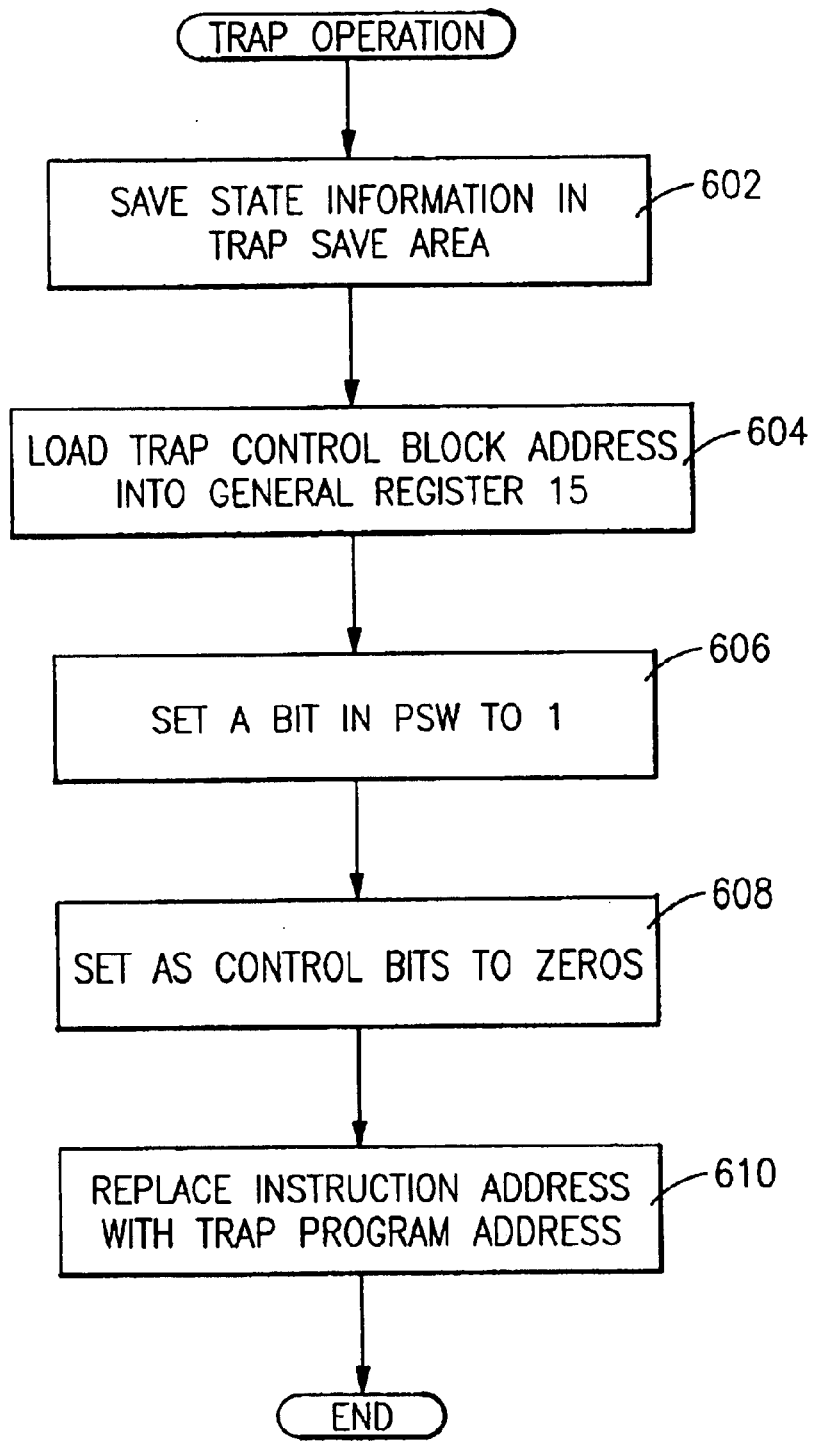
FIG. 6 shows the flow of execution of the Trap operation of a Trap instruction.
Figure 7:
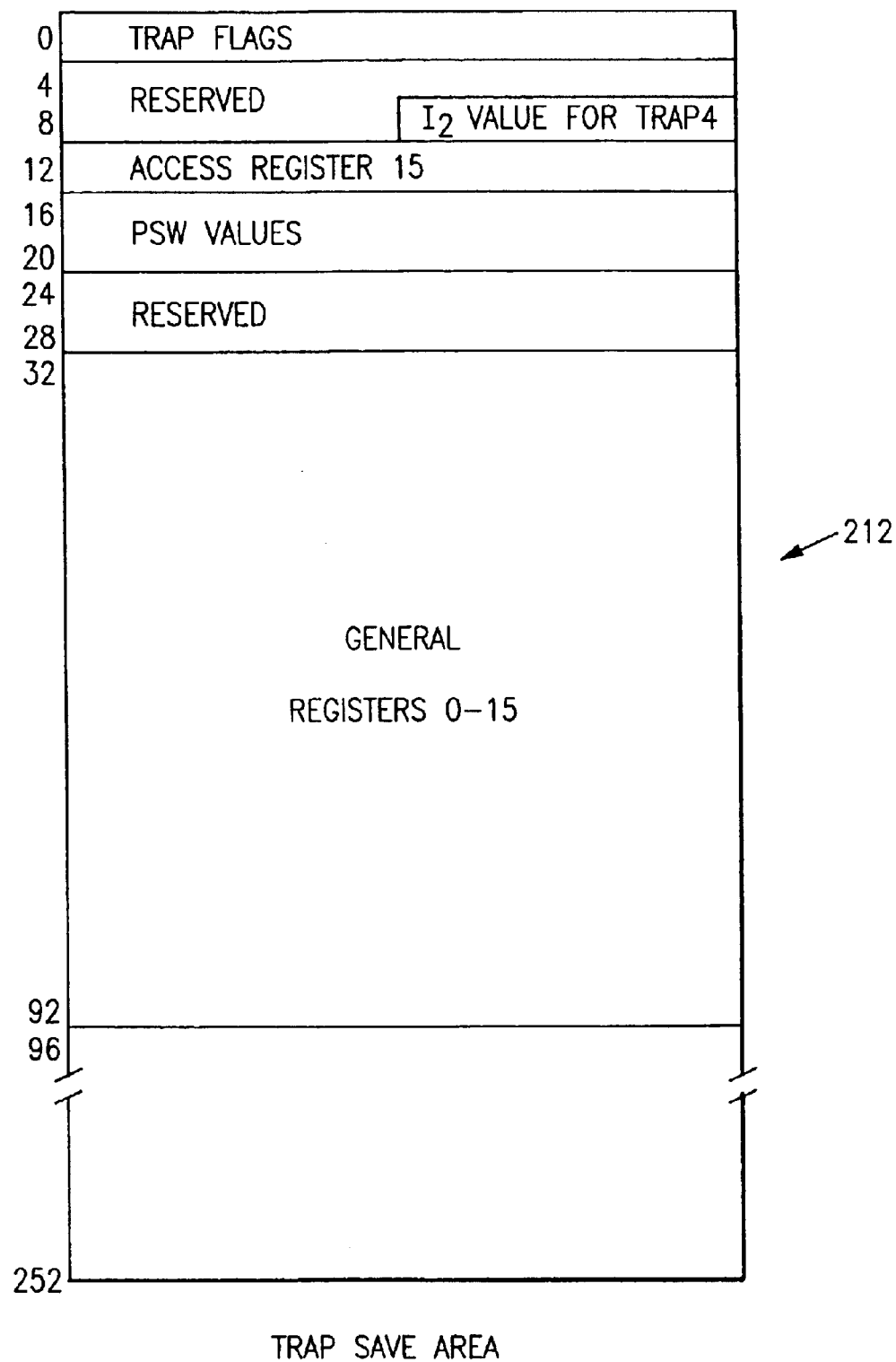
FIG. 7 shows the trap save area.

Referring now to FIG. 6, the trap operation uses address values from the trap control block 208 that is designated in the DUCT 202. First, state information is stored in the trap save area 212 (step 602). Then, the trap control block address 206 is loaded into general register 15 of the set of general registers 110 (step 604). Finally, the A bit 812 (FIG. 8) in the PSW 114 is set to one (31-bit mode) (step 606), the address space control bits (AS) 806 are set to zeros (primary space mode) (step 608), and the trap program address 214 replaces the instruction address (step 610). The trap program 216 receives control with the A bit 812 (FIG. 8) in the PSW 114 set to one (31-bit mode) and the AS bits 806 set to 00 (primary space mode). The values that were in use when the Trap instruction 152' was issued are stored in the trap save area 212 (FIG. 7). When the program simulates the overlaid instruction 152', the results must be consistent with the A and AS values in the trap save area 212.

The trap control block 208 and trap save area 212 are accessed using 31-bit addresses. The trap program address 214 is treated as a 31-bit address.

The second operand effective address contains 24 or 31 bits, depending on the A bit in the PSW. However, it is not used to access storage; instead, it is stored in the trap save area.

The trap operation is nullified when a segment translation or page translation exception is recognized while accessing the trap control block 208 or the trap save area 212. The trap operation is suppressed on special operation, addressing, and protection exceptions.

The trap operation does not change the condition code (CC) 808 (FIG. 8). Program exceptions include: (1) access (store, trap save area 212; fetch, trap control block 208); (2) addressing (dispatchable unit control table, trap save area 212, trap control block 208); (3) operation (if the instruction is not installed); (4) special operation; and (5) trace.

Referring to FIG. 7, the trap save area 212 is 256 bytes long. It is aligned on a doubleword boundary. A trap operation stores the following information in the trap save area 212:

| Bytes   | Meaning                                |
|---------|----------------------------------------|
| 0–3     | Trap flags                             |
| 4–7     | Reserved, zeros stored                 |
| 8–11    | Second operand address for Trap4       |
| 12–15   | Access register 15                     |
| 16–23   | PSW values                             |
| 24–31   | Reserved, zeros stored                 |
| 32–95   | General registers 0–15                 |
| 96–159  | Reserved, unchanged                    |
| 160–167 | Reserved for program use, unchanged    |
| 168–255 | Reserved, unchanged                    |

Bytes 96–159 in the trap save area 212 extend the general register field (bytes 32–95). Similarly, bytes 24–31 in the trap save area 212 extend the PSW field (bytes 16–23).

The second operand address for a Trap4 instruction is stored in bytes 8–11 of the trap save area 212; zeros are stored for a Trap2 instruction. The contents of access register 15 are stored in bytes 12–15 of the trap save area 212. Bytes 16–23 of the trap save area 212 have the format of a PSW in which these PSW values are stored:

| PSW Bits | Value                        |
|----------|------------------------------|
| 14       | Wait state                   |
| 15       | Problem state                |
| 16–17    | Address space control (AS)   |
| 18–19    | Condition code (CC)          |
| 20–23    | Program mask                 |
| 32       | Addressing mode (A)          |
| 33–63    | Instruction address          |

Bits 0, 2–4, and 24–31 are zero. Bit 12 is one. The values in bits 1, 5–11, and 13 are undefined.

Preferably, CPU 102 also stores the current PSW values in bits 1, 5–11, 13 of bytes 16–23 in the trap save area 212.

The wait state, problem state, address space control, condition code, program mask and addressing mode values represent the state of the CPU before the Trap instruction is performed.

The instruction address value is the address that would have appeared in the PSW had the Trap operation not changed the PSW, and is derived from the address of the previous PSW instruction.

More particularly, the latter address is incremented by two if the previous instruction was a Trap2 instruction and by four if the previous instruction was a Trap4 or Execute instruction.

The contents of general registers 0–15 are stored in bytes 32–95 of the trap save area 212. They are stored in ascending order of register numbers, starting with general register 0 and continuing up to and including general register 15.

The flag values stored in bytes 0–3 of the trap save area 212 are:

| Flag Bits | Meaning |
|---|---|
| 0 | Execute |
| 1 | Trap4 |
| 2–12 | Reserved, zeros stored |
| 13–14 | Instruction length code (ILC) |
| 15–31 | Reserved, zeros stored |

Flag bit 0 is one when the Trap instruction is the target of an Execute instruction; otherwise, the flag is zero. Flag bit 1 is one when the Trap instruction is Trap4; otherwise, the flag is zero. Bits 13–14 indicate the length, according to the ILC definition, of the Trap instruction, or the Execute instruction if its target is Trap.

If the execute flag (bit 0) in the trap save area 212 is one, the trap program 216 derives the second operand address and the OR mask for Execute. The second operand address is used to search the window control table 222. When the $R_1$ field for Execute is not zero, the value in bits 24–31 of general register $R_1$ is ORed with bits 8–15 of the overlaid instruction before simulating the instruction. The following logic may be used:
1. Subtract four from the instruction address in the PSW stored in the trap save area 212 to obtain the address of the Execute instruction.
2. MVC bytes 1–3 of the Execute instruction to an LA instruction. MVZ a register number to bits 8–11 of the LA. Issue BCR 15,0 to serialize (needed in AR mode). Issue the LA to load the address of the Trap instruction.
3. TM bits 0–3 of byte 1 of the Execute instruction—if they are all zero, set a working OR mask to zero. Otherwise, MVZ byte 1 of the Execute instruction to an STC instruction, issue BCR 15,0 to serialize (needed in AR mode), and issue the STC to store the OR mask.

The trap control block 208 and trap save area 212 should be mapped into the home address space. Mapping them into the same locations of the primary address space makes the address loaded into general register 15 useful to the program. If the trap control block 208 and trap save area 212 are not mapped to the same locations of the primary and home address spaces, and if the primary segment table designator (STD) differs from the home STD when Trap is executed, then the trap areas are not directly addressable. They can be addressed using access registers if the operating system provides a proper environment or by issuing a SAC to the home address space, if allowed.

Placing the trap control block 208 and the trap save area 212 on 64-byte and 256-byte boundaries, respectively, is optimal with respect to containment within virtual pages and cache lines, and enhances system performance.

The trap control block 208 and trap save area 212 are accessed using the key (bits 8–11) in the PSW 114 (FIGS. 1 and 8). They may be placed in separate virtual pages if different protection characteristics are needed.

Figure 9:
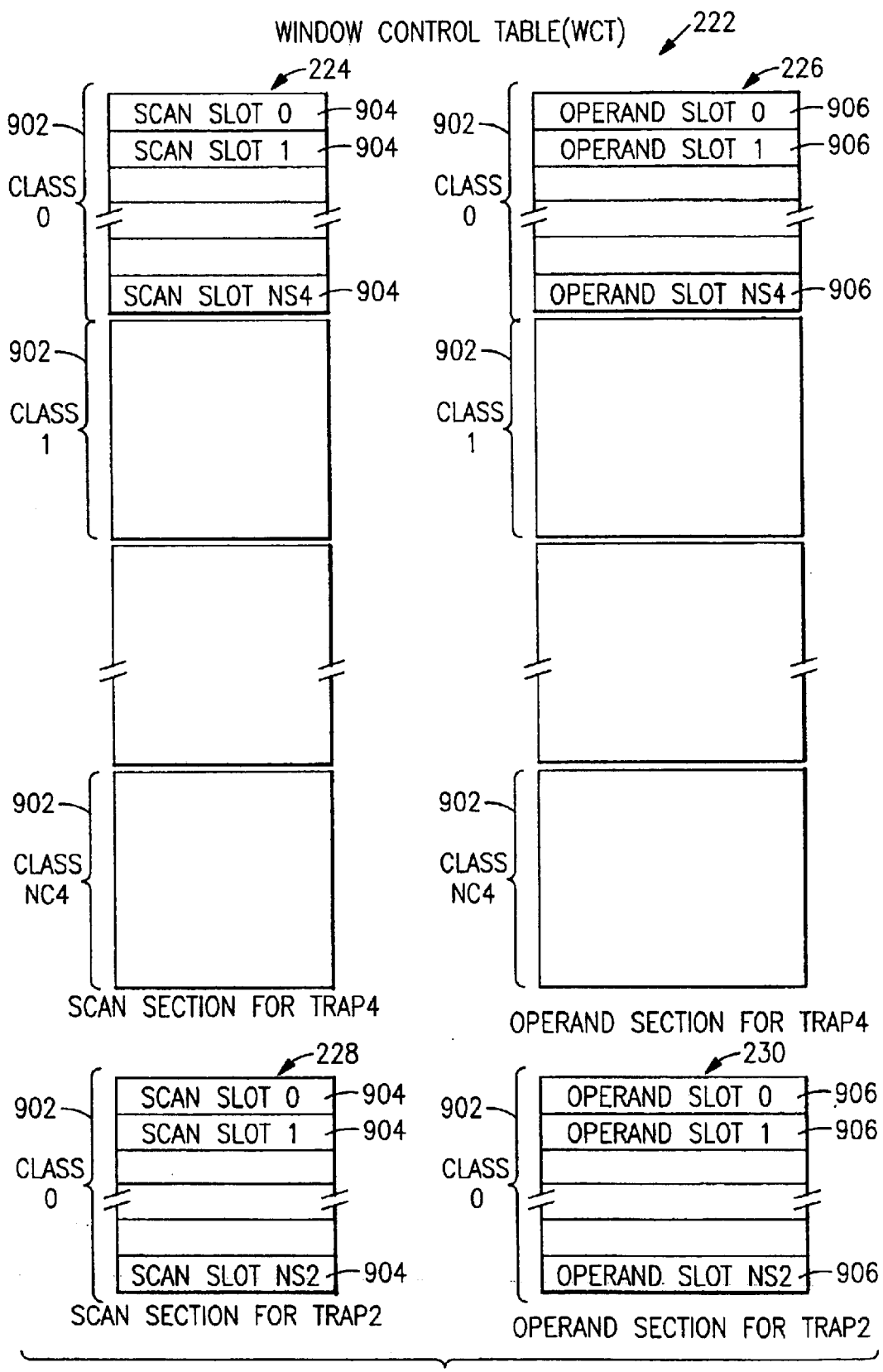
FIG. 9 shows the structure of the window control table.

The trap program 216, trap control block 208, trap save area 212, WCT descriptor 220, and window control table 222 may be located above the 24-bit addressing limit, even when they are used with 24-bit applications. –The trap save area 212 and the trap control block 208 are located in the home address space so that an operating system simulation routine for Trap instructions can find them reliably. As noted elsewhere herein, they should also be mapped into the primary address space so that the program monitor 108 can access them. –The window control table descriptor 220 is located in the primary space because only the program monitor 108 accesses it. –Referring to FIGS. 2 and 9, the window control table (WCT) 222 is divided into sections, classes, and slots. More particularly, window control table (WCT) 222 contains four sections: a scan section 224 for Trap4, an operand section 226 for Trap4, a scan section 228 for Trap2, and an operand section 230 for Trap2. –Each of sections 224–230 contains one or more classes 902, and each class 902 contains one or more slots 904 or 906 containing control information. More particularly, scan section 224 for Trap4 comprises a plurality of classes 902, each of which contains one or more scan slots 904; operand section 226 for Trap4 comprises a plurality of classes 902, each of which contains one or more operand slots 906; scan section 228 for Trap2 comprises a single class 902 containing one or more scan slots 604; and operand section 230 for Trap2 comprises a single class 902 containing one or more operand slots 906.

An instruction 152 that is overlaid by a Trap4 instruction 152' is assigned a class number. When the $B_2$ field of the Trap4 instruction 152' is zero, the class range is 0–4,095 and the class number is designated by the second operand address, which is stored in the trap save area. The trap program 216 searches the designated class in the window control table 222 to locate information associated with the overlaid instruction; search time is reduced by spreading instructions evenly among the classes.

The scan and operand sections 224, 226 for Trap4 have an equal number of classes 902, and each class 902 has the same number of slots 904 or 906. The classes 902 and slots 904 in the scan section 224 for Trap4 correspond, one for one, with the classes 902 and slots 906 in the operand section 226. As noted above, the scan and operand sections 228, 230 for Trap2 have one class 902. The slots 904 in the scan section 228 for Trap2 correspond, one for one, with the slots 906 in the operand section 230.

Each slot 904 in the scan sections 224, 228 for Trap2 and Trap4 is four bytes long. Each slot 906 in the operand sections 226, 230 for Trap2 and Trap4 contains an equal number of bytes.

Referring back to FIG. 2, the window control table (WCT) descriptor 220 specifies the remaining structure of the table 222. The WCT descriptor 220 is 64 bytes long. It is aligned on a double-word boundary. Its format is:

| Bytes | Field | Use |
|---|---|---|
| 4–7 | SA4 | Scan address for Trap4 (232) |
| 12–15 | OA4 | Operand address for Trap4 (234) |
| 20–23 | SA2 | Scan address for Trap2 (236) |
| 28–31 | OA2 | Operand address for Trap2 (238) |
| 32–33 | NC4 | Number of classes for Trap4 (240) |
| 34–35 | OSL | Operand slot length (242) |
| 36–39 | NS4 | Number of slots for Trap4 (244) |
| 40–43 | NS2 | Number of slots for Trap2 (246) |

Bytes 0–3, 8–11, 16–19, 24–27, and 44–63 are reserved and should be zeros.

The contents of bits 1–28 of bytes 4–7, with 3 zeros appended on the right, form the address 232 in the primary address space of the scan section 224 for Trap4. The contents of bits 1–28 of bytes 12–15, with 3 zeros appended on the right, form the address 234 in the primary address space of the operand section 226 for Trap4. The contents of bits 1–28 of bytes 20–23, with 3 zeros appended on the right, form the address 236 in the primary address space of the scan section 228 for Trap2. The contents of bits 1–28 of bytes 28–31, with 3 zeros appended on the right, form the address 238 in the primary address space of the operand section 230 for Trap2. In each case, bits 0 and 29–31 are ignored.

The binary value 240 (NC4) in bytes 32–33 specifies the number of additional classes 902 after the first class in the scan and operand sections 224, 226 for Trap4; it is in the range 0–4,095. The binary value 242 (OSL) in bytes 34–35 specifies the number of bytes in each slot 906 of the operand sections 226, 230 for Trap4 and Trap2. The binary value 244 (NS4) in bytes 36–39 specifies the number of additional slots 904, 906 after the first slot in each class 902 of the scan and operand sections 224, 226 for Trap4; it is in the range 0–32,767. The binary value 246 (NS2) in bytes 40–43 specifies the number of additional slots 904, 906 after the first slot in each class 902 of the scan and operand sections 228 and 230 for Trap2; it is in the range 0–32,767.

In what follows, V( . . . ) denotes the value contained in the . . . field of the WCT descriptor 220. A value SCL4 specifies the number of bytes in each class 902 of the scan section 224 for Trap4; it is equal to 4*(1+V(NS4)). A value OCL4 specifies the number of bytes in each class 902 of the operand section 226 for Trap4. It is equal to V(OSL)*(1+V(NS4)).

Some starting locations in the primary address space are as follows. The address of slot S in class C of the scan section 224 for Trap4 is: V(SA4)+(V(SCL4)*C)+(4*S). The address of slot S in class C of the operand section 226 for Trap4 is: V(OA4)+(V(OCL4)*C)+(V(OSL)*S). The address of slot S in the scan section 228 for Trap2 is V(SA2)+(4*S). The address of slot S in the operand section 230 for Trap2 is V(OA4)+(V(OSL)*S).

Considering first a Trap4 example, with 256 classes 902 of 4 slots 904, 906 each, there are 1,024 scan slots 904 and 1,024 operand slots 906 in the Trap4 sections 224, 226 of the window control table (WCT) 222. The scan slots 904 in class 0 start at locations V(SA4), V(SA4)+4, V(SA4)+8, and V(SA4)+12. The operand slots 906 start at locations V(OA4), V(OA4)+V(OSL), V(OA4)+2*V(OSL), and V(OA4)+3*V(OSL).

The scan slots 904 in class 1 start at locations V(SA4)+16, V(SA4)+20, V(SA4)+24, and V(SA4)+28. The operand slots 906 start at locations V(OA4)+4*V(OSL), V(OA4)+5*V(OSL), V(OA4)+6*V(OSL), and V(OA4)+7*V(OSL).

The address arithmetic is similar for classes 2–255.

Considering now a Trap2 example with 4,096 slots 904, 906 in the Trap2 sections 228, 230 of the window control table (WCT) 222, the scan slots 904 start at locations V(SA2), V(SA2)+4, . . . , V(SA2)+16,380. The operand slots 906 start at locations V(OA2), V(OA2)+V(OSL), V(OA2)+2*V(OSL), . . . , V(OA2)+4,095*V(OSL).

The address of the instruction 152 (FIG. 1B) that was overlaid by a Trap instruction 152' (FIG. 1C) is contained in bits 1–31 of the scan slots 904 that are assigned to the instruction. Bits 0 of the slots 904 are ignored.

The instruction addresses in the scan slots 904 for each class 902 must appear in increasing order. That is, for a given class 902, the instruction address in a specific scan slot 904 is smaller than the instruction in the next higher slot as identified by its slot number.

Figure 10:
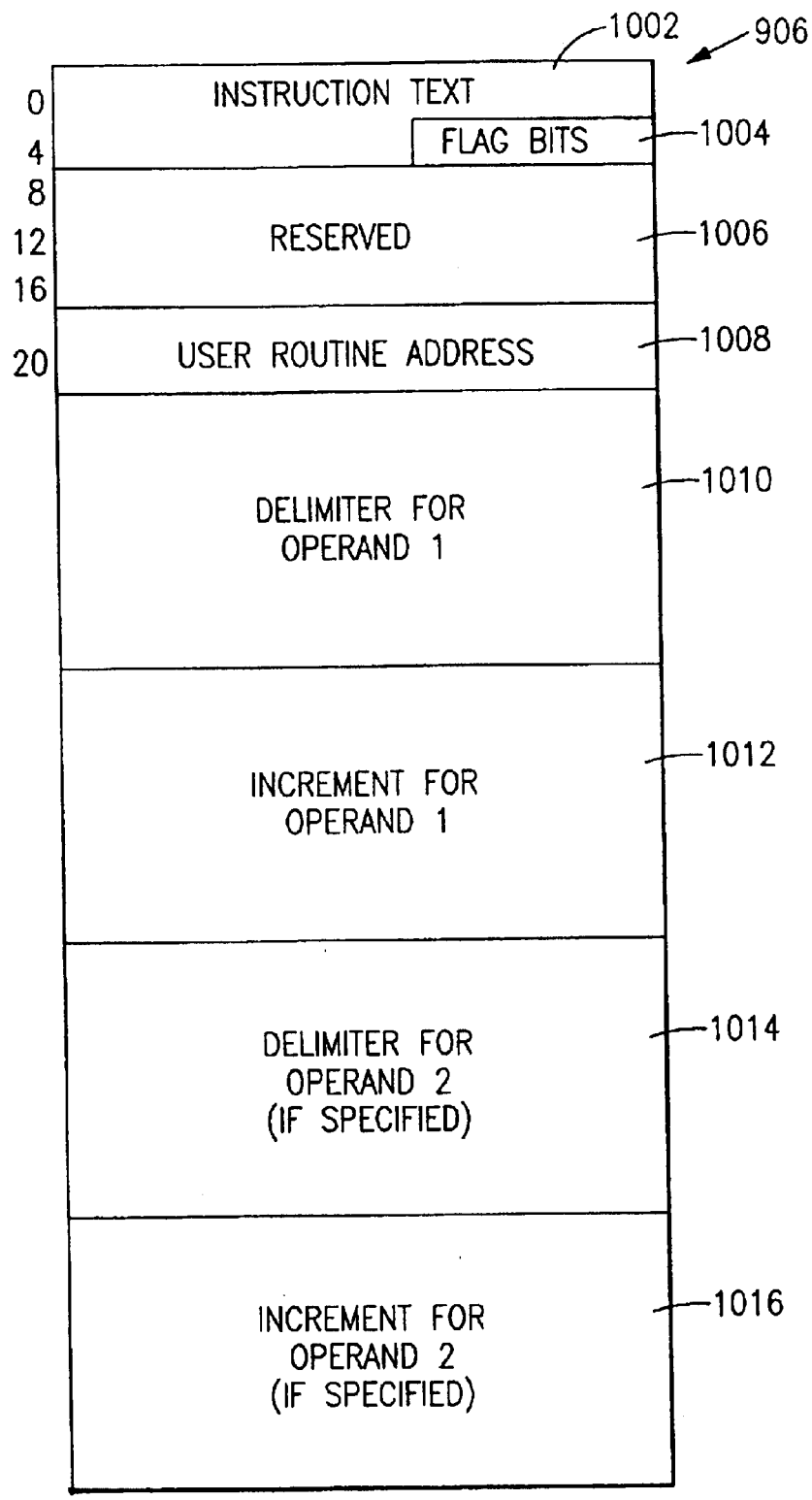
FIG. 10 shows the general format of an operand slot.

Referring to FIG. 10, each operand slot 906 is 88 bytes long (V(OSL)=88) and contains the same fields in bytes 0–23, which are as follows:

| Bytes | Meaning |
| --- | --- |
| 0–5 | Instruction text (1002) |
| 6–7 | Flag bits 0–15 (1004) |
| 8–19 | Reserved for extensions, must be zeros (1006) |
| 20–23 | User routine address (1008) |

The text 1002 of the overlaid instruction 152 (FIG. 1B) is contained in bytes 0–5 of the operand slot 906.

Figure 11A:
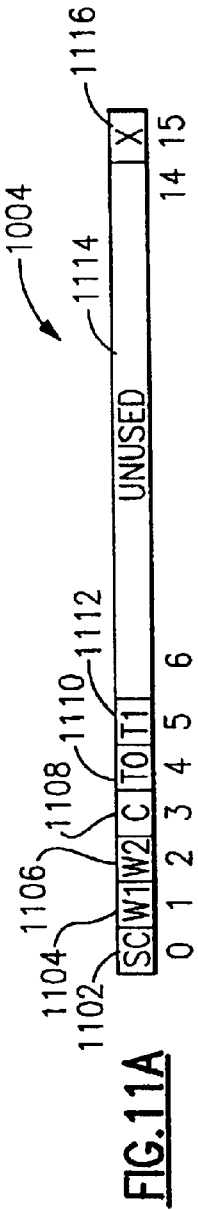
FIG. 11A shows the flag bits for executing a compare, add, subtract or multiply instruction.

Referring also to FIG. 11A, Table 1 below shows the flag bits 1004 for executing a compare, add, subtract, or multiply instruction:

TABLE 1

Flag bits for executing a compare, add, subtract, or multiply instruction.

| Bit | Meaning |
| --- | --- |
| 0 | Slot Control (SC) 1102: If bit 0 is zero, one slot is assigned for the instruction. The delimiter and increment in the operand slot are used for both operands of a CLC instruction with zoned decimal operands. If bit 0 is one, two consecutive slots in the same class are assigned for the instruction, and the scan slots contain the same address. If the instruction is a CLC, the delimiter and increment in the first operand slot are used for operand 1, and the delimiter and increment in the second operand slot are used for operand 2. |
| 1 | Window 1 (W1) 1104: If bit 1 is one and the first operand is non-negative and less than the delimiter for operand 1, the instruction is executed as though the increment for operand 1 was added to the first operand before performing the operation of the instruction. |
| 2 | Window 2 (W2) 1106: If bit 2 is one and the second operand is non-negative and less than the delimiter for operand 2, the instruction is executed as though the increment for operand 2 was added to the second operand before performing the operation of the instruction. |
| 3 | Cycle (C) 1108: If the instruction is subtract, bit 3 is one, and both operands are non-negative, then the increment for operand 1 is added to the difference the instruction would otherwise produce when that difference is less than zero. If the instruction is add, bit 3 is one, one operand is non-negative, and the other operand is negative, then the increment for operand 1 is added to the sum the instruction would otherwise produce when that sum is less than zero. |

TABLE 1-continued

Flag bits for executing a compare, add, subtract, or multiply instruction.

| Bit | Meaning |
|---|---|
| 4–5 | CLC Type (T0-T1) 1110, 1112: Bits 4–5 specify the operand type for a CLC instruction. Comparisons and additions called for by flag bits 1–2 use that data type.<br>Bits 4–5    Operand type<br>00        Zoned decimal values<br>01        Packed decimal values<br>10        Binary values<br>Bits 4–5 are zeros if the instruction is not CLC. |
| 6–14 | Unused 1114: Must be zeros. |
| 15 | Execute (X) 1116: Bit 15 must be one to cause the instruction to be executed, as controlled by flag bits 0–5. |

Figure 11B:
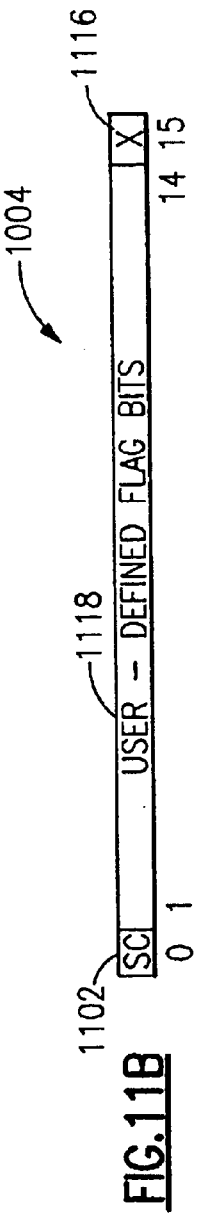
FIG. 11B shows the flag bits for invoking a user routine.

Referring also to FIG. 11B, Table 2 below shows the flag bits 1004 for invoking a user routine 154 (FIG. 1D):

TABLE 2

Flag bits for invoking a user routine

| Bit | Meaning |
|---|---|
| 0 | Slot control (SC) 1102: If bit 0 is zero, one slot is assigned for the instruction. Otherwise, two consecutive slots are assigned in the same class, and the scan slots contain the same address. |
| 1–14 | User-defined flag bits 1118. |
| 15 | Execute (X) 1116: Bit 15 must be zero to invoke a user routine instead of executing the instruction. |

When the execute flag 1116 is zero, bytes 20–23 of the operand slot 906 contain the address 1008 of a user routine 154 (FIG. 1D) in the primary address space; the routine 154 is invoked instead of executing the instruction 152. When the execute flag 1116 is one, bytes 20–23 of the operand slot 906 are ignored.

Table 3 below shows the valid overlaid instruction, flag, and length combinations:

Referring also to FIG. 10, the format of the operand slot 906 for an instruction that has packed decimal operands is:

| Bytes | Meaning |
|---|---|
| 0–23 | See above |
| 24–24 + $L_1$ | Delimiter for operand 1 (1010); a packed decimal value of the same length as the first operand of the instruction. |
| 40–(41 + $L_1$) | Increment for operand 1 (1012); a packed decimal value that is one byte longer than the first operand. |
| 56–(56 + $L_2$) | Delimiter for operand 2 (1014); a packed decimal value of the same length as the second operand of the instruction. |
| 72–(73 + $L_2$) | Increment for operand 2 (1016); a packed decimal value that is one byte longer than the second operand. |

Note that for a CLC instruction, $L=L_1=L_2$. The other bytes in the slot 906 are reserved and should contain zeros.

A CLC instruction has that zoned decimal operands uses one or two operand slots 906. The format of each operand slot 906 is:

TABLE 3

Valid Overlaid Instruction, Flag, and Length Combinations

| | Flag Bits | | | | | | | | |
|---|---|---|---|---|---|---|---|---|---|
| Instructions (use) | SC | W1 | W2 | C | T0 | T1 | 6–14 | X | Length Bounds | Operand Slot Type |
| CLC (window) | 0/1 | 0/1 | 0/1 | 0 | 0 | 0 | 0 | 1 | L < 30 | Zoned decimal |
| CLC (window) | 0/1 | 0/1 | 0/1 | 0 | 0 | 1 | 0 | 1 | L < 15 | Packed decimal |
| CLC (window) | 0 | 0/1 | 0/1 | 0 | 1 | 0 | 0 | 1 | L = 1 | Binary halfword |
| CLC (window) | 0 | 0/1 | 0/1 | 0 | 1 | 0 | 0 | 1 | L = 3 | Binary word |
| MP (window) | 0 | 0/1 | 0/1 | 0 | 0 | 0 | 0 | 1 | $L_1$ < 15, $L_2$ < 7 | Packed decimal |
| SP, CP, AP (window) | 0 | 0/1 | 0/1 | 0 | 0 | 0 | 0 | 1 | $L_1$ < 15, $L_2$ < 15 | Packed decimal |
| SP, AP (cycle) | 0 | 0 | 0 | 1 | 0 | 0 | 0 | 1 | $L_1$ < 15, $L_2$ < 15 | Packed decimal |
| S, SR, C, CR, A, AR, M, MSR, MS (window) | 0 | 0/1 | 0/1 | 0 | 0 | 0 | 0 | 1 | | Binary word |
| SH, CH, AH, AHI, MH, MHI (window) | 0 | 0/1 | 0/1 | 0 | 0 | 0 | 0 | 1 | | Binary halfword |
| S, SR, A, AR (cycle) | 0 | 0 | 0 | 1 | 0 | 0 | 0 | 1 | | Binary word |
| SH, AH, AHI (cycle) | 0 | 0 | 0 | 1 | 0 | 0 | 0 | 1 | | Binary halfword |
| Any (user routine) | 0/1 | 0/1 | 0/1 | 0/1 | 0/1 | 0/1 | 0/1 | 0 | | |

Notes:
0/1 indicates that 0 or 1 is valid.
Bit 1, bit 2, or both (window) must be one for compare and multiple instructions. And for add and subtract instructions when bit 3 (cycle) is zero.

| Bytes | Meaning |
|---|---|
| 0–23 | See above |
| 24–(24 + L) | Delimiter (1010); a packed decimal or zoned decimal value, as specified by the type flag, that is the same length as the operands of the instruction. |
| 56–(57 + L) | Increment (1012); a packed decimal or zoned decimal value, as specified by the type flag, that is one byte longer than the instruction operands. |

The other bytes in the slot 906 are reserved and should contain zeros.

The format of the operand slot 906 for an instruction that has fullword binary operands is:

| Bytes | Meaning |
|---|---|
| 0–23 | See above |
| 24–27 | Delimiter for operand 1 (1010): a positive binary value. |
| 28–31 | Increment for operand 1 (1012): a positive binary value. |
| 32–35 | Delimiter for operand 2 (1014): a positive binary value. |
| 36–39 | Increment for operand 2 (1016): a positive binary value. |

Similarly, the format of the operand slot 906 for an instruction that has halfword binary operands is:

| Bytes | Meaning |
|---|---|
| 0–23 | See above |
| 24–25 | Delimiter for operand 1 (1010): a positive binary value. |
| 28–29 | Increment for operand 1 (1012): a positive binary value. |
| 32–33 | Delimiter for operand 2 (1014): a positive binary value. |
| 36–37 | Increment for operand 2 (1016): a positive binary value. |

A user routine 154 (FIG. 1D) is invoked when the execute flag 1116 is zero. The instruction uses one or two operand slots 906. The contents of the operand slots 906, except for bytes 0–23, are defined by the user.

The overlaid instruction 152 is not executed if a user routine 154 is invoked. Instead, trap program 216 is used to pass control to the user routine 154 that is designated in bytes 20–23 of the first operand slot 906. The user routine 154 yields control back to the trap program 216, which returns to the application 104 by issuing a Resume Program instruction 156.

FIGS. 12A–12D show the general flow of the instruction simulation function 118 (FIG. 1). As already noted, the instruction simulation function 118 may be implemented either in hardware or in software.

When a Trap4 instruction 152' (FIG. 3B) is issued, the second operand B$_2$, D$_2$ designates a class 902 in the Trap4 sections 224 and 226 of the window control table (WCT) 222; that class 902 is searched to locate information associated with the overlaid instruction 152. When a Trap2 instruction 152' (FIG. 3A) is issued, the single class 902 in the Trap2 sections 228 and 230 of the WCT 222 is searched.

Upon being invoked, the instruction simulation function 118 searches the scan slots 904 for the class 902 by comparing the address of the Trap to the instruction address values in the slots 904 until an equal compare occurs, the instruction address value in a slot 904 is smaller than the search address, or unequal compare occurs for the last slot 904 in the class 902; the slots 904 are searched in increasing order of slot numbers (step 1202).

If an equal compare is found (step 1204), the values in the corresponding operand slot(s) 906 determine the action taken by the instruction simulation function 118. Thus, if the execution flag 1116 (FIG. 11A) is one (step 1206) and the overlaid instruction, flag, and length combination (Table 3) is valid (step 1208), then the overlaid instruction 152 is executed as governed by the values in flag bits 1102–1112 (step 1210).

Figure 12A:
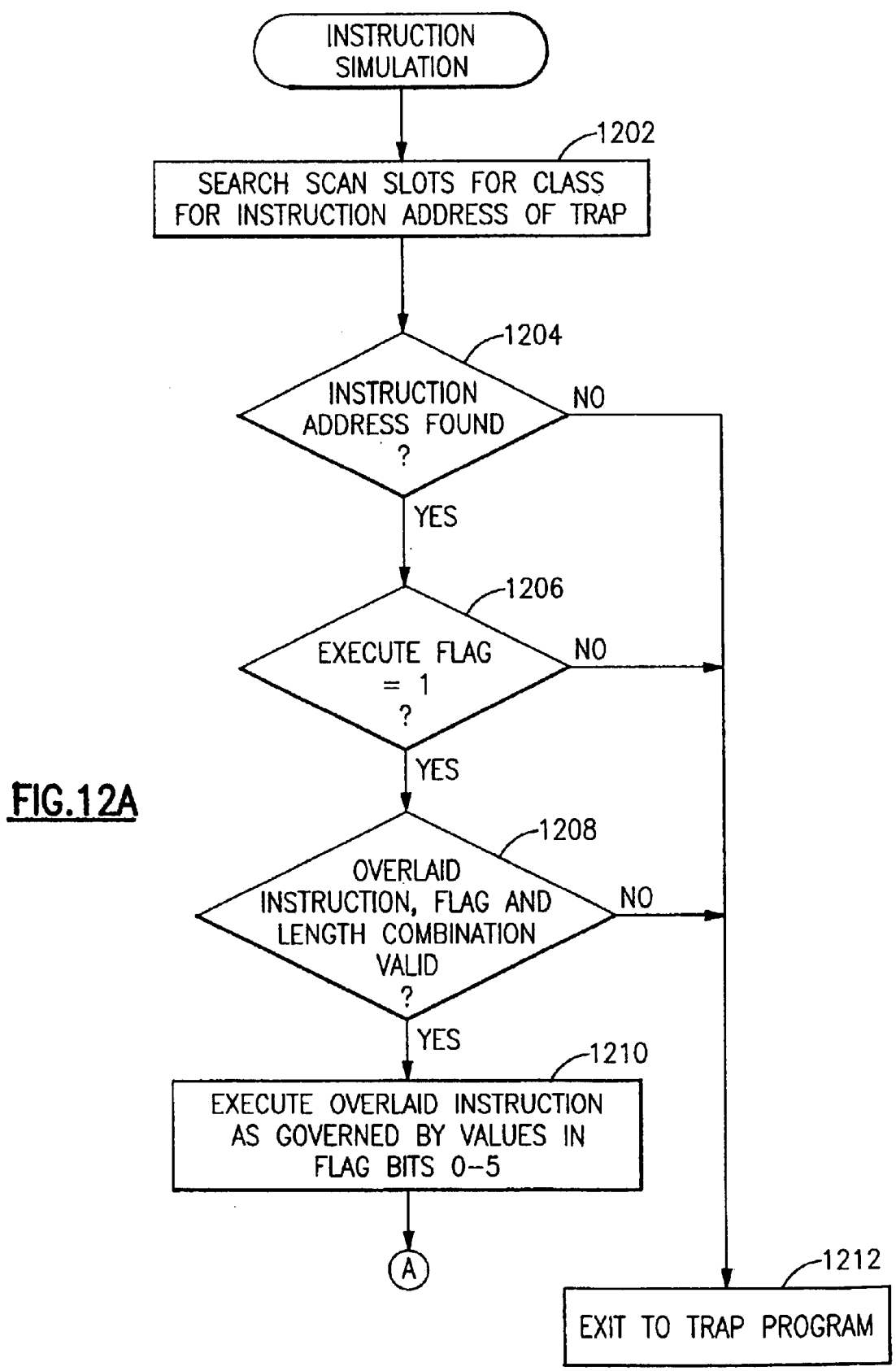
FIGS. 12A–12E show the procedure of the trap program.
Figure 12B:
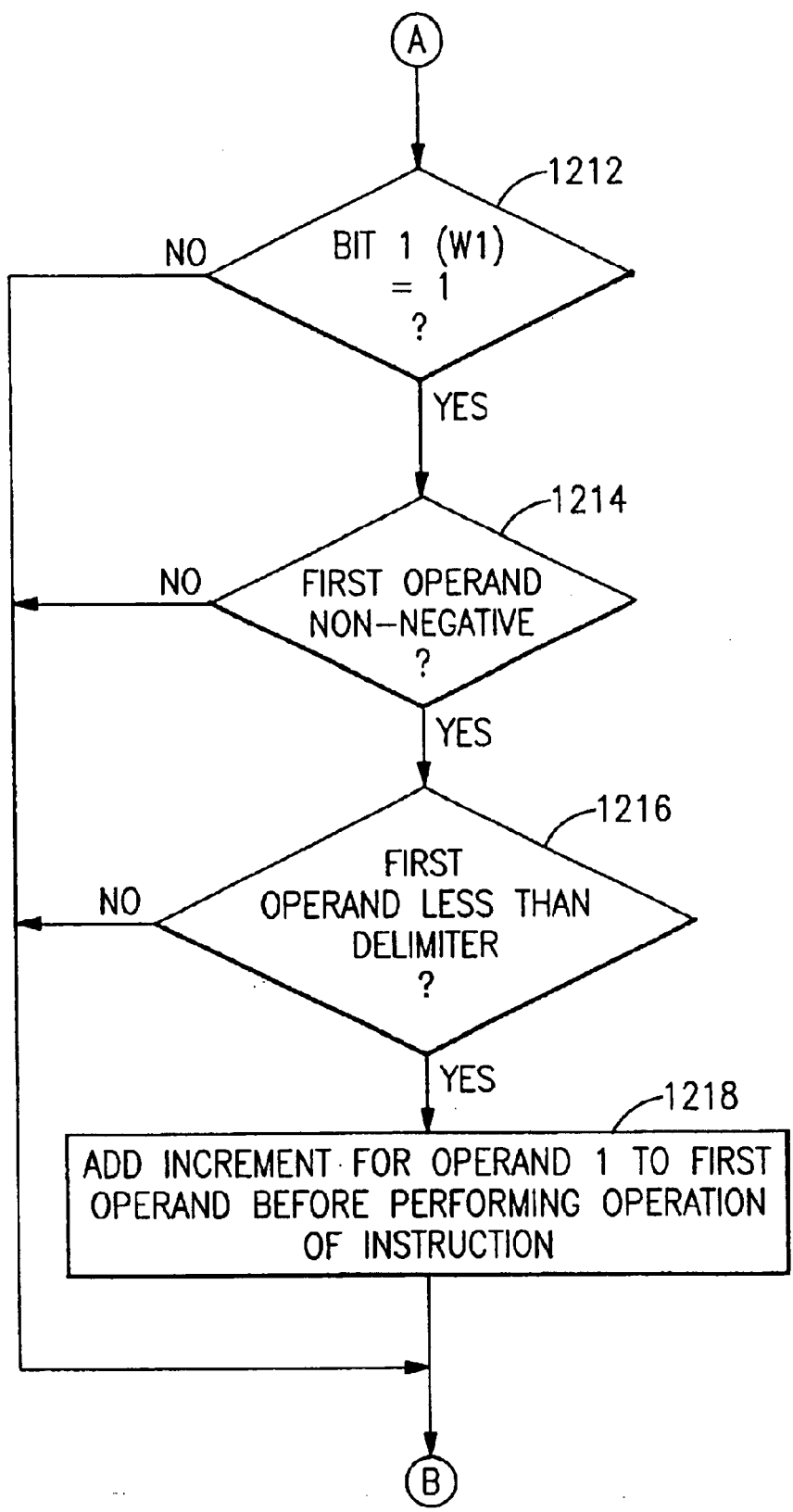

Referring to FIG. 12B, if the flag bit 1104 (W1) is one (step 1212), this indicates that a windowing operation is performed on the first operand. More particularly, if the first operand is non-negative (step 1214) and is less than the delimiter (step 1216), then the instruction simulation function 118 executes the instruction as though the increment for operand 1 were added to the first operand before performing the operation of the instruction (step 1218). If the instruction is a CLC instruction, then the operand type is determined by flag bits 1110 (T0) and 1112 (T1).

Figure 12C:
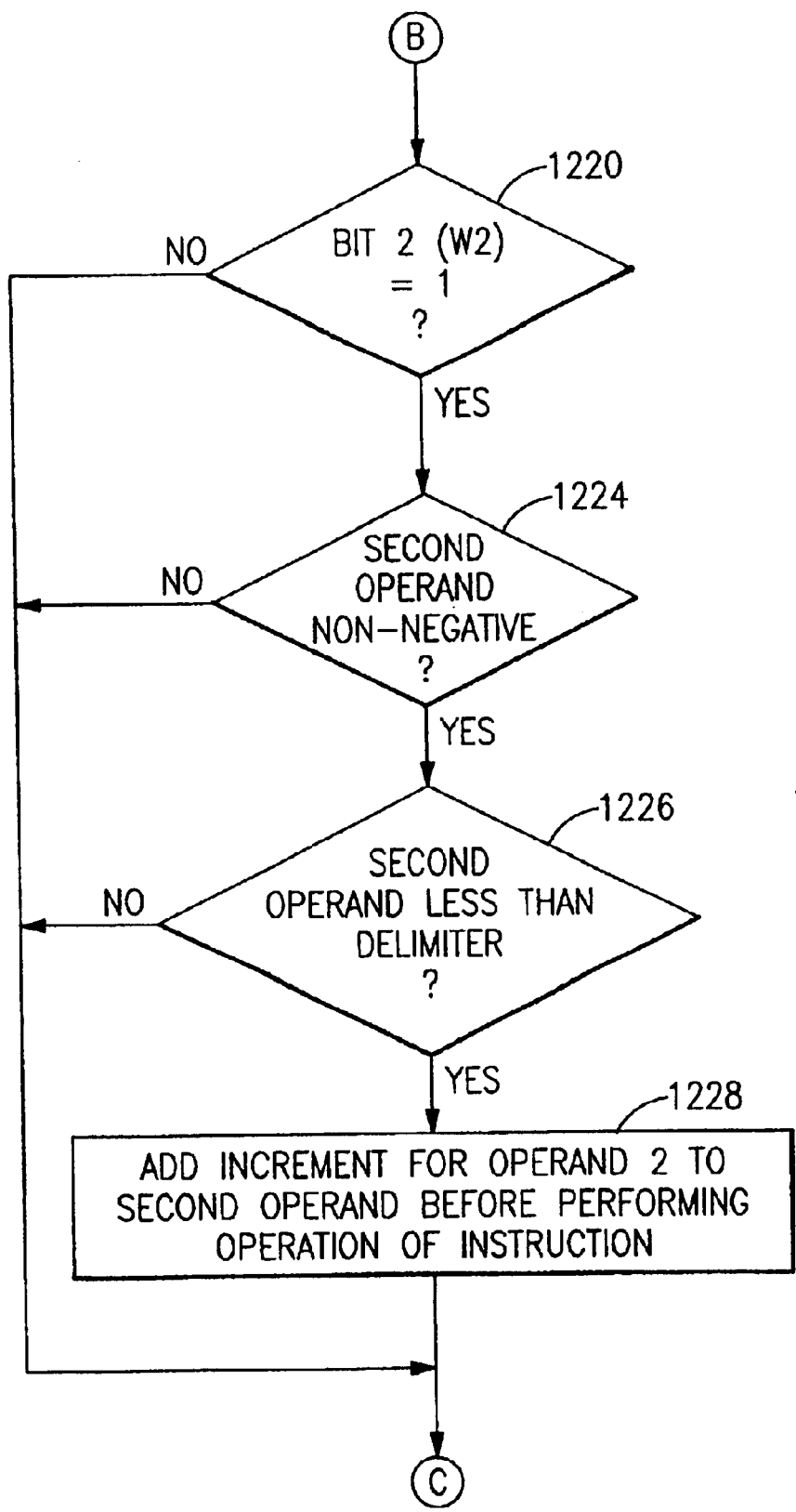

Similarly, referring to FIG. 12C, if the flag bit 1106 (W2) is one (step 1220), this indicates that a windowing operation is performed on the second operand. More particularly, if the second operand is non-negative (step 1222) and is less than the delimiter (step 1224), then the instruction simulation function executes the instruction as though the increment for operand 2 were added to the second operand before performing the operation of the instruction (step 1226).

Figure 12D:
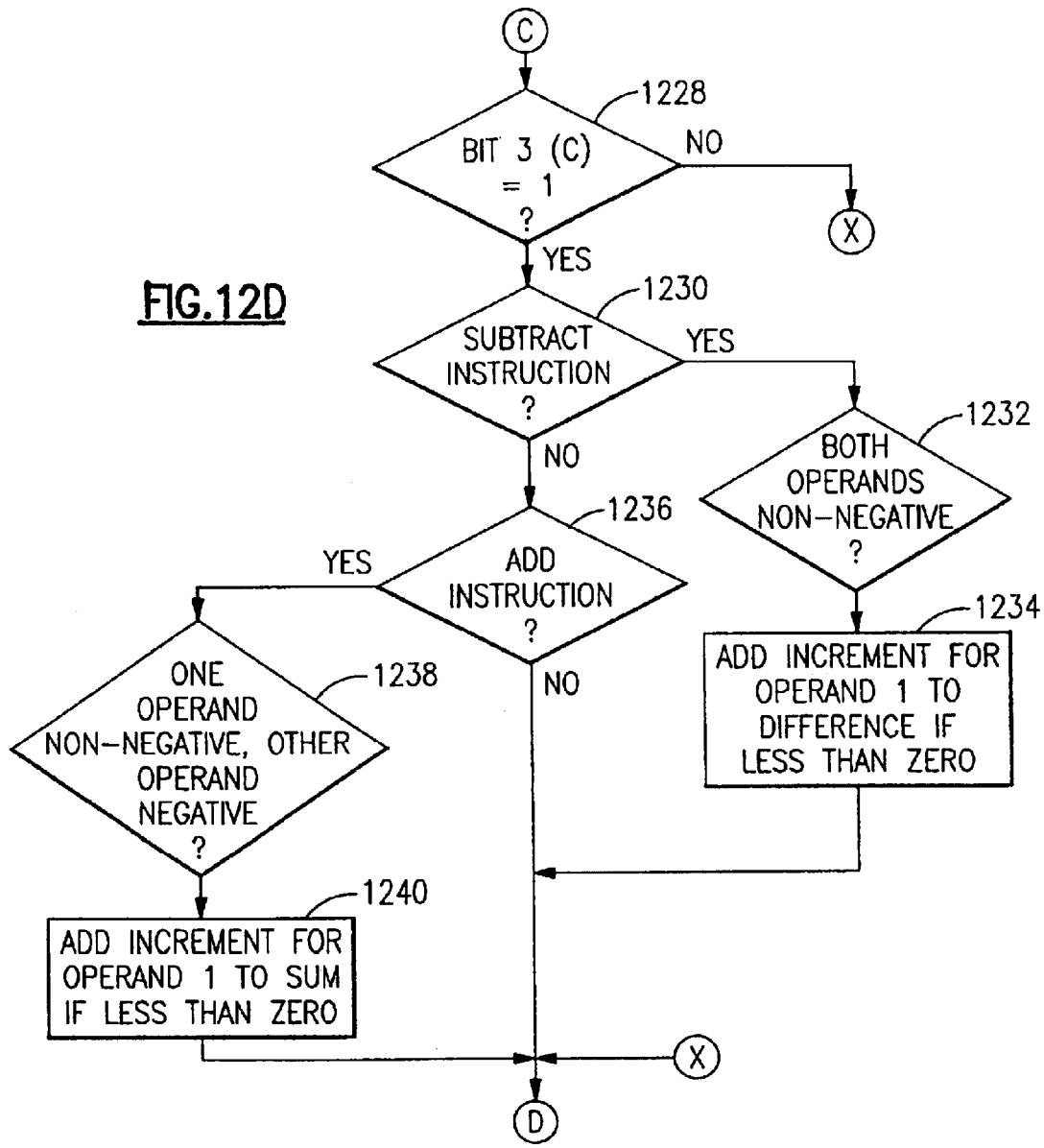

Referring to FIG. 12D, if the flag bit 1108 (C) is one (step 1228), this indicates that a cycling operation is performed on the first and second operands. More particularly, if the instruction is a subtract instruction (step 1230) and both operands are non-negative (step 1232), then the instruction simulation function 118 adds the increment for operand 1 to the difference the instruction would otherwise produce if that difference is less than zero (step 1234). Similarly, if the instruction is an add instruction (step 1236) and one operand is non-negative while the other operand is negative (step 1238), the instruction simulation function 118 adds the increment for operand 1 to the sum the instruction would otherwise produce if that sum is less than zero (step 1240).

The trap program 216 returns to the application 104 after loading the following state information, including values derived from the trap save area 212: (1) the contents of general registers 0–15 and access register 15; (2) the address space control, program mask, and addressing mode values; (3) the initial condition code, if it is to be restored; and (4) the instruction address 814 in the PSW from the trap save area 212, or two more than that address if the overlaid instruction is six bytes long and Trap was not the target of an Execute. A Resume Program instruction completes the return sequence, as described below.

Figure 12E:
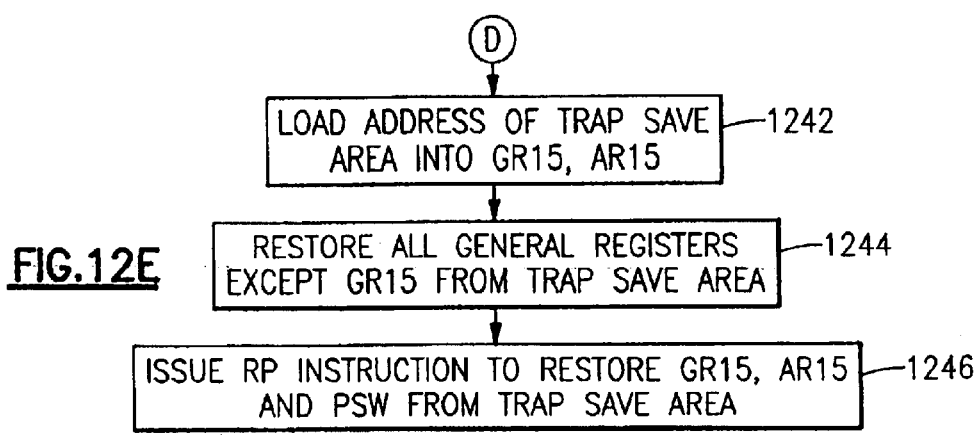

Referring to FIG. 12E, after it has performed its remediation operations, instruction simulation function 118 returns control to the user program 104 at the point of interruption. As shown in the figure, the instruction simulation function 118 first loads the address of the trap save area 212 into the general register/access register pair GR15/AR15 (step 1242). Next, the instruction simulation function 118 restores from the trap save area 212 all general registers 110 that are not needed by the Resume Program (RP) instruction 156 itself to access the trap save area 212. In the embodiment shown, this is done by issuing a Load Multiple (LM) instruction to restore the contents of the set of general registers GR0–GR14 from the GR field of the trap save area 212 (step 1244). Finally, the instruction simulation function 118 issues a Resume Program (RP) instruction 156 to return control to the user program 104 and to fully restore the program context at the point of the trap instruction 152' (step 1248). As described in the above-identified application of D. F. Ault et al., the RP instruction 156 uses the content of the general register GR15 (and access register AR15, if needed) specified in the instruction 156 to access the trap save area 212 and restore the saved contents of GR15, AR15 and PSW 114. At this point, the instruction simulation function 118 terminates and the user program 104 resumes execution at the instruction 158 following the trap instruction 152', as indicated by the instruction address field 814 in the restored PSW 114.

The overlaid instruction is not executed by the hardware and the function of a Trap instruction is performed when any of the following occurs: (1) the execution flag is zero; (2) the overlaid instruction, flag, and length combination is not valid (see Table 3); (3) an invalid value is recognized in the WCT descriptor 220; or (4) no equal compare is found for the instruction address, including a case where the class 902 number exceeds the NC4 value in the WCT descriptor 220

Performing the Trap function transfers control to a trap program 216. The trap program 216 may invoke a user routine, provide additional simulation capabilities not implemented in the hardware, or handle an exception case.

When a window is applied to a packed decimal operand, the increment is added, using a working storage area that is one byte longer than the operand, before performing the operation of the instruction; for MP instructions, the multiplication uses a working storage area that is large enough to avoid any overflow. For subtract, add, and multiply instructions, the result is copied to the first operand locations, truncating as necessary.

When a window is applied to a zoned decimal CLC operand, the increment is added, using a working storage area that is one byte longer than the operand, before making a comparison. If only one operand is windowed, the other operand is copied to a working storage area that is one byte longer than the operands before comparing them; the copied value is right justified and padded with a zero character in the left-hand byte. Pack and Uupack can be applied to allow comparisons and additions to use CP and AP instructions.

When cycling is applied to a packed decimal result, the increment is added, using a working storage area that is one byte longer than the result, after performing the operation of the instruction. The result is copied to the first operand locations, truncating as necessary. The condition code set for the overlaid instruction indicates the sign and the magnitude of the result that appears in the first operand locations, as follows:

| CC | Condition |
|----|-----------|
| 0 | Result in first operand locations is zero |
| 1 | Result in first operand locations less than zero |
| 2 | Result in first operand locations greater than zero |

When a window is applied to a binary operand, the increment is added, using a temporary variable, before performing the operation of the instruction.

When cycling is applied to a binary result, the increment is added to the result after performing the operation of the instruction. The condition code set for the overlaid instruction indicates the sign and the magnitude of the result that appears in the first operand locations, as follows:

| CC | Condition |
|----|-----------|
| 0 | Result in first operand locations is zero |
| 1 | Result in first operand locations less than zero |
| 2 | Result in first operand locations greater than zero |

When the execution flag is one, the Trap instruction causes a data exception to be recognized, without windowing or cycling being applied, when either of the following occur: (1) windowing is specified for a packed decimal or zoned decimal operand, and the delimiter or increment contains an invalid decimal digit or sign; or (2) cycling is specified for a packed decimal result, and the increment contains an invalid decimal digit or sign.

Trap causes an addressing exception to be recognized without windowing or cycling being applied, and without invoking a trap program 216, if an invalid address is encountered when accessing the DUCT 202, the trap control block (TCB) 208, the WCT descriptor 220, or the window control table (WCT) 222.

When Trap is the target of an Execute instruction, bits 24–31 of register $R_1$ are effectively (but not in reality) ORed with byte 1 of the overlaid instruction, as contained in the operand slot 906, before the instruction is executed.

The following additionally describes how the present invention may be used to solve year 2000 problems.

For CLC instructions, the programmer specifies a list of CLC instructions that windowing is to be applied to. The programmer also specifies for each such CLC instruction: (1) the data type of its operands (i.e., zoned decimal, packed decimal, or binary); (2) whether to apply windowing to the first operand; and (3) whether to apply windowing to the second operand. If windowing is to be applied to an operand, for each such operand the programmer specifies: (a) a delimiter of the same data type and length as the CLC operands (e.g., 410000 for a 41-year window for Gregorian dates, 41000 for a 41-year window for Julian dates, or 41 for a 41-year window for YY values); and (b) an increment (e.g., 1000000 for Gregorian dates, 100000 for Julian dates, or 100 for YY values), of the same data type as and one byte longer than the CLC operands, that is added to first operands that are smaller than the delimiter For a CP, SP, or MP window, the programmer specifies a list of decimal instructions that windowing is to be applied to. The programmer also specifies for each instruction: (1) whether to apply windowing to the first operand; and (2) whether to apply windowing to the second operand; this is done by setting the Window 1 (W1) flag 1104, the Window 2 (W2) flag 1106, or both in the operand slot 906 for the instruction equal to 1. If windowing is to be applied to an operand, for each such operand the programmer specifies: (a) packed decimal delimiter of the same length as the first operand (e.g., 410000 for a 41-year window for Gregorian dates, 41000 for a 41-year window for Julian dates, or 41 for a 41-year window for YY values); and (b) a packed decimal increment (e.g., 1000000 for a Gregorian date, 100000 for a Julian date, or 100 for a YY value) that is one byte longer than the first operand and that is added to first operands that are smaller than the delimiter; this is done for each such operand by setting the delimiter 1010 or 1014 and the increment 1012 or 1016 for the operand in the operand slot 906 for the instruction equal to the appropriate values.

For an SP or AP cycle, the programmer specifies a list of SP and AP instructions that a cycle is to be applied to. The programmer also specifies for each instruction a packed decimal increment (e.g., 1000000 for a Gregorian date, 100000 for a Julian date, or 100 for a YY value) that is one byte longer than the first operand and that is added to the result produced by the instruction when that result is less than 0. For example, for the operation of subtracting 3 years from the date Jan. 1, 2002, the arithmetic operation for a Gregorian (YYMMDD) date would be 020101−30000=−009899, so add 1000000 giving 990101.

For an SH, AH, M, MH window, the programmer specifies a list of binary instructions (e.g., S, SH, C, CR, CH) that windowing is to be applied to. The programmer also specifies the following for each instruction: (1) whether to apply windowing to the first operand; and (2) whether to apply windowing to the second operand; this is done by setting the Window 1 (W1) flag 1106, the Window 2 (W2) flag 1108, or both in the operand slot 906 for the instruction equal to 1. If windowing is to be applied to an operand, for each such operand the programmer specifies: (a) a binary delimiter of the same length as the first operand (e.g., 410000 for a 41-year window for Gregorian dates, 41000 for a 41-year window for Julian dates, or 41 for a 41-year window for YY values); and (b) a binary increment (e.g., 1000000 for a Gregorian date, 100000 for a Julian date, or 100 for a YY value) that is added to first operands that are smaller than the delimiter.

For an SR or SH cycle, the programmer specifies a list of binary add and subtract instructions that a cycle is to be applied to. The programmer also specifies the following for each instruction a binary increment (e.g., 1000000 for a Gregorian date, 100000 for a Julian date, or 100 for a YY value) that is the same length as the first operand and that is added to the result produced by the instruction when that result is less than 0. For example, 020101−30000=−009899, so add 1000000 giving 990101.

For user routines, the programmer specifies a list of instructions that are to invoke user routines. A particular user routine is specified for each such instruction.

While a particular embodiment has be shown and described, various modifications will be obvious to those skilled in the art. Thus, while the invention is preferably implemented using the hardware trap instruction described above, it may be implemented without using such an instruction. Also, while a software implementation has been described, a hardware implementation is also possible, as described above. Various other modifications and extensions will be apparent to those skilled in the art.

What is claimed is:

1. A method for runtime remediation of object-code instructions in a computer program, comprising the steps of:

storing a table containing a table entry for each program instruction that is to be remediated, each table entry containing one or more remediation parameters;

detecting a program location corresponding to an instruction to be remediated while executing the program; and upon detecting a program location corresponding to an instruction to be remediated, executing the instruction to be remediated in accordance with the remediation parameters in the table entry corresponding to the instruction to be remediated.

2. The method of claim 1 in which each table entry contains an execution flag and one or more remaining flags, the executing step comprising the steps of:

executing the instruction to be remediated in accordance with the remaining flags if the execution flag has a first value; and invoking a user routine without executing the instruction to be remediated if the execution flag has a second value.

3. The method of claim 2 in which the table entry corresponding to the instruction to be remediated indicates the address of the user routine.

4. The method of claim 1 in which the remediation parameters specify a delimiter, the step of executing the instruction to be remediated in accordance with the remediation parameters in the table entry comprising the steps of:

comparing an operand of the instruction to a delimiter; and executing the instruction as though an increment were added to the operand before performing the operation of the instruction if the operand is less than the delimiter.

5. The method of claim 4 in which the remediation parameters include the increment.

6. The method of claim 4 in which the remediation parameters specify operands of the instruction on which the comparing and executing steps are to be performed.

7. The method of claim 4 in which the instruction has first and second operands, the remediation parameters specifying a delimiter for each of the operands.

8. The method of claim 4 in which the instruction has first and second operands, the remediation parameters specifying a delimiter and an increment for each of the operands.

9. The method of claim 4 in which the remediation parameters specify a data type for the instruction.

10. The method of claim 1 in which the remediation parameters include an increment, the step of executing the instruction to be remediated in accordance with the remediation parameters in the table entry comprising the step of:

adding the increment to the result the instruction would otherwise produce if that result is less than zero.

11. The method of claim 1 in which the instruction to be remediated is overlaid with a trap instruction, the detecting step comprising the step of:

detecting a trap instruction.

12. The method of claim 11 in which each table entry corresponding to an instruction to be remediated contains a text of the instruction.

13. The method of claim 1 in which said object-code instructions perform arithmetic or comparison operations on data.

14. The method of claim 13 in which said data comprises year date data.

15. The method of claim 1 in which said object-code instructions operate on data having a specified format, said executing step operating on said data in said format in accordance with said remediation parameters while leaving said format unchanged.

16. Apparatus for runtime remediation of object-code instructions in a computer program, comprising:

means for storing a table containing a table entry for each program instruction that is to be remediated, each table entry containing one or more remediation parameters;

means for detecting a program location corresponding to an instruction to be remediated while executing the program; and means responsive to detecting a program location corresponding to an instruction to be remediated for executing the instruction to be remediated in accordance with the remediation parameters in the table entry corresponding to the instruction to be remediated.

17. The apparatus of claim 16 in which each table entry contains an execution flag and one or more remaining flags, the executing means comprising:

means for executing the instruction to be remediated in accordance with the remaining flags if the execution flag has a first value; and means for invoking a user routine without executing the instruction to be remediated if the execution flag has a second value.

18. The apparatus of claim 16 in which the remediation parameters specify a delimiter, the executing means comprising:

means for comparing an operand of the instruction to a delimiter; and means for executing the instruction as though an increment were added to the operand before performing the operation of the instruction if the operand is less than the delimiter.

19. The apparatus of claim 16 in which the remediation parameters include an increment, the executing means comprising:

means for adding the increment to the result the instruction would otherwise produce if that result is less than zero.

20. The apparatus of claim 16 in which said object-code instructions perform arithmetic or comparison operations on data.

21. The apparatus of claim 20 in which said data comprises year date data.

22. The apparatus of claim 16 in which said object-code instructions operate on data having a specified format, said executing means operating on said data in said format in accordance with said remediation parameters while leaving said format unchanged.

23. A program storage device readable by a machine, tangibly embodying a program of instructions executable by the machine to perform method steps for runtime remediation of object-code instructions in a computer program, the method steps comprising:

storing a table containing a table entry for each program instruction that is to be remediated, each table entry containing one or more remediation parameters;

detecting a program location corresponding to an instruction to be remediated while executing the program; and upon detecting a program location corresponding to an instruction to be remediated, executing the instruction to be remediated in accordance with the remediation parameters in the table entry corresponding to the instruction to be remediated.

24. The program storage device of claim 23 which each table entry contains an execution flag and one or more remaining flags, the executing step comprising:

executing the instruction to be remediated in accordance with the remaining flags if the execution flag has a first value; and invoking a user routine without executing the instruction to be remediated if the execution flag has a second value.

25. The program storage device of claim 23 which the remediation parameters specify a delimiter, the executing step comprising:

comparing an operand of the instruction to a delimiter; and executing the instruction as though an increment were added to the operand before performing the operation of the instruction if the operand is less than the delimiter.

26. The program storage device of claims 23 in which the remediation parameters include an increment, the executing step comprising:

adding the increment to the result the instruction would otherwise produce if that result is less than zero.

27. The program storage device of claim 23 which said object-code instructions perform arithmetic or comparison operations on data.

28. The program storage device of claim 27 in which said data comprises year date data.

29. The program storage device of claim 23 in which said object-code instructions operate on data having a specified format, said executing step operating on said data in said format in accordance with said remediation parameters while leaving said format unchanged.

* * * * *